US010989916B2

(12) United States Patent
Rodgers et al.

(10) Patent No.: US 10,989,916 B2
(45) Date of Patent: Apr. 27, 2021

(54) POSE PREDICTION WITH RECURRENT NEURAL NETWORKS

(71) Applicant: Google LLC, Mountain View, CA (US)

(72) Inventors: Ivana Tosic Rodgers, Redwood City, CA (US); David Chu, Seattle, WA (US); Mohammad Moharrami, Seattle, WA (US); Sebastian Sylvan, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/545,803

(22) Filed: Aug. 20, 2019

(65) Prior Publication Data

US 2021/0055545 A1 Feb. 25, 2021

(51) Int. Cl.
*G02B 27/00* (2006.01)
*G02B 27/01* (2006.01)
*G06N 3/04* (2006.01)
*G06T 19/00* (2011.01)

(52) U.S. Cl.
CPC ....... *G02B 27/0093* (2013.01); *G02B 27/017* (2013.01); *G06N 3/04* (2013.01); *G06T 19/006* (2013.01)

(58) Field of Classification Search
None
See application file for complete search history.

(56) References Cited

U.S. PATENT DOCUMENTS

| 10,679,378 | B1* | 6/2020 | Reddy | G06F 3/012 |
| 2016/0077166 | A1 | 3/2016 | Morozov et al. | |
| 2019/0370550 | A1* | 12/2019 | Chen | G06T 19/006 |
| 2020/0027275 | A1* | 1/2020 | Wan | G06F 3/016 |

OTHER PUBLICATIONS

S. Wang et al. ("End-to-end, sequence-to-sequence probabilistic visual odometry through deep neural networks;" The International Journal of Robotics Research 2018, vol. 37(4-5), pp. 513-542) (Year: 2018).*

H. Wang et al ("VRED: A Positionn-Velocity Recurrent Rncoder-Decoder for Human Motion Prediction;" pp. 1-9; eprint arXiv: 1906.06514; Pub Date: Jun. 2019) (Year: 2019).*

(Continued)

*Primary Examiner* — Edward Martello
(74) *Attorney, Agent, or Firm* — Brake Hughes Bellermann LLP

(57) ABSTRACT

Systems, methods, and computer program products are described for receiving a request for a head pose prediction for an augmented reality experience, identifying at least one positional indicator and at least one rotational indicator associated with the augmented reality experience, and providing the at least one positional indicator and the at least one rotational indicator to a Recurrent Neural Network (RNN) comprising a plurality of cells. The RNN may include a plurality of recurrent steps that each include at least one of the plurality of cells and at least one fully connected (FC) layer. The RNN may be used to generate at least one pose prediction corresponding to head pose changes for the augmented reality experience for at least one upcoming time period, provide the at least one pose prediction and trigger display of augmented reality content based on the at least one pose prediction.

20 Claims, 12 Drawing Sheets

(56) References Cited

OTHER PUBLICATIONS

Ababsa, et al., "Comparison Between Particle Filter Approach and Kalman Filter-Based Technique for Head Tracking in Augmented Reality Systems", Proceedings of the 2004 IEEE International Conference on Robotics & Automation, Apr. 2004, 6 pages.

Azuma, "Predictive Tracking for Augmented Reality", TR95-007, PhD dissertation, Univ. of North Carolina at Chapel Hill, Feb. 1995., 262 pages.

Himberg, et al., "Head Orientation Prediction: Delta Quaternions Versus Quatemions", IEEE Transactions on Systems, Man, and Cybernetics—part B: Cybernetics, vol. 39, No. 6, Dec. 2009, pp. 1382-1392.

Kendall, et al., "PoseNet: A Convolutional Network for Real-Time 6-DOF Camera Relocalization", 2015 IEEE Interational Conference on Computer Vision, pp. 2938-2946.

Lavalle, et al., "Head Tracking for the Oculus Rift", 2014 IEEE International Conference on Robotics and Automation (ICRA), 8 pages.

Laviola, Jr., "Double Exponential Smoothing: An Alternative to Kalman Filter-Based Predictive Tracking", International Immersive Projection Technologies Workshop, Eurographics Workshop on Virtual Environments, 2003, 8 pages.

List, "Nonlinear prediction of head movements for helmet mounted displays", Operations Training Division Air Force Human Resources Laboratory, Tech. Rep., Dec. 1983, 24 pages.

Xu, et al., "Predicting Head Movement in Panoramic Video: A Deep Reinforcement Learning Approach", IEEE Transactions on Pattern Analysis and Machine Intelligence 2018, Sep. 2018, 15 pages.

Zaremba, et al., "Recurrent Neural Network Regularization", ICLR 2015, Feb. 2015, 8 pages.

Extended European Search Report for EP Application No. 20190537.9, dated Mar. 10, 2021, 13 pages.

Barniv, et al., "Using EMG to Anticipate Head Motion for Virtual-Environment Applications", IEEE Transactions on Biomedical Engineering, vol. 52, No. 6, Jun. 2005, pp. 1078-1093.

Huang, et al., "Deep Inertial Poser: Learning to Reconstruct Human Pose from Sparse Inertial Measurements in Real Time", ACM Transactions on Graphics, vol. 37, No. 6, Dec. 4, 2018, pp. 1-15.

Martinez, et al., "On human motion prediction using recurrent neural networks", Cornell University Library, May 6, 2017, 10 pages.

\* cited by examiner

POSE PREDICTION WITH RECURRENT NEURAL NETWORKS

TECHNICAL FIELD

This disclosure relates to Virtual Reality (VR) and/or Augmented Reality (AR) experiences and/or Mixed Reality (MR) and predicting a pose associated with users accessing such experiences.

BACKGROUND

In an immersive experience, such as an experience generated by a Virtual Reality (VR) system or an Augmented Reality (AR) system, tracking may provide insight into a user's future movements while in the VR/AR experience. The tracking may be supplemented by predictions of where the user may move next. When VR/AR content is tracked and/or rendered remotely, such as on a base station in the same location of a VR/AR-enabled device, latency may be introduced by the round-trip time from the device to a rendering server and back to the device. The introduced latency may cause errors in the accuracy of predicting movements of the user.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described. The computer-implemented method includes receiving a request for a head pose prediction for an augmented reality experience, identifying at least one positional indicator and at least one rotational indicator associated with the augmented reality experience, and providing the at least one positional indicator and the at least one rotational indicator to a Recurrent Neural Network (RNN) comprising a plurality of cells. The RNN may include a plurality of recurrent steps that each include at least one of the plurality of cells and at least one fully connected (FC) layer. At least some of the plurality of cells may be associated with a historical time period. The computer-implemented method may also include using the RNN to generate at least one pose prediction corresponding to head pose changes for the augmented reality experience for at least one upcoming time period and providing the at least one pose prediction responsive to the request and triggering display of augmented reality content in the augmented reality experience based on the at least one pose prediction.

Particular implementations of the computer-implemented method may include any or all of the following features. The at least one positional indicator may be a three-dimensional head position vector and the at least one rotational indicator may be a four-dimensional quaternion. In some implementations, the at least one rotational indicator includes a yaw, a pitch, and a roll. In some implementations, the at least one rotational indicator may be a three-dimensional vector having a magnitude that represents an amount of rotation, and a direction that represents an axis of rotation.

In some implementations, the RNN is configured to generate additional candidate predictions based on the at least one pose prediction and to determine a mean square error for each of the additional candidate predictions, the mean square error indicating whether to discard a respective additional head pose prediction. In some implementations, the RNN is configured to recursively determine additional predictions for head pose changes at further upcoming time periods.

In some implementations, receiving the request for a head pose prediction includes receipt of historical head pose data from a client device over a network. In some implementations, providing the at least one pose prediction for head pose changes includes providing rendered content in the augmented reality experience to the client device over the network based on the at least one pose prediction for head pose changes.

In another general aspect, a computer-implemented method for predicting poses in a virtual reality environment includes obtaining historical pose data corresponding to user movements in the virtual reality environment, generating a first historical vector sequence including pose features determined from the historical pose data, and determining, using the first historical vector sequence executing a Recurrent Neural Network (RNN), a first pose prediction for an upcoming time period. The RNN may include a plurality of long short-term memory (LSTM) cells and at least one fully connected neural network layer. The computer-implemented method may further include generating, using the RNN and the first historical vector sequence, a first pose prediction for an upcoming time period and recursively generating, using the RNN, a plurality of additional pose predictions for subsequent time periods in response to receiving the first pose prediction and a state of at least one of the plurality of LSTM cells.

Particular implementations of the computer-implemented method may include any or all of the following features. For example, the historical pose data corresponding to user movements in the virtual reality environment may include velocity or acceleration measurements associated with the user movements. In some implementations, the method may further include determining locations in which to display virtual reality content based on the additional pose predictions at corresponding time periods beyond the upcoming time period and triggering rendering of the virtual reality content for display in the virtual reality environment.

In some implementations, the first historical vector sequence represents input to the RNN that is normalized based at least in part on a calculated mean value and a calculated variance value and the first pose prediction and the plurality of additional pose predictions are denormalized based on the calculated mean value and the calculated variance value before determining locations in which to display virtual reality content. In some implementations, a state of each LSTM cell in the plurality of LSTM cells is provided as input to the RNN with a next sequential pose prediction and the plurality of additional pose predictions are based at least in part on the state of each LSTM cell in the plurality of LSTM cells.

In some implementations, the RNN is trained on a database of known pose sequences and the historical pose data is sequential pose data associated with a mobile device executing a virtual reality application. In some implementations, the RNN is configured to determine an error function that defines a mean absolute error, a smoothness cost, and a pose change cost for each of the plurality of additional pose predictions.

In some implementations, the error function is determined based on detected angular error or detected eye location error associated with one or more of the plurality of additional pose predictions. In some implementations, the error function represents a weighted error based on a portion of the plurality of the additional pose predictions.

In another general aspect, a computer program product tangibly embodied on a non-transitory computer-readable medium and comprising instructions that, when executed, are configured to cause at least one processor to receive a request for a pose prediction for an augmented reality experience, identify at least one positional indicator and at least one rotational indicator associated with the augmented reality experience, and provide the at least one positional indicator and the at least one rotational indicator to a Recurrent Neural Network (RNN) comprising a plurality of cells, the RNN including a plurality of recurrent steps that each include at least one of the plurality of cells and at least one fully connected (FC) layer, at least some of the plurality of cells being associated with a historical time period. The method may also include using the RNN to generate at least one pose prediction corresponding to pose changes for the augmented reality experience for at least one upcoming time period and providing the at least one pose prediction responsive to the request and trigger display of augmented reality content in the augmented reality experience based on the at least one pose prediction.

Particular implementations of the computer-implemented method may include any or all of the following features. For example, the RNN may be configured to generate additional candidate predictions based on the at least one prediction and determine a mean square error for each of the additional candidate predictions. The mean square error may indicate whether to discard a respective additional pose prediction.

In some implementations, the at least one rotational indicator comprises a three-dimensional vector having a magnitude that represents an amount of rotation, and a direction that represents an axis of rotation. In some implementations, the at least one positional indicator is a three-dimensional head position vector and the at least one rotational indicator is a four-dimensional quaternion.

In some implementations, the plurality of cells are long short-term memory (LSTM) cells and the RNN is configured to recursively determine additional predictions for pose changes at further upcoming time periods. In some implementations, the RNN is configured to encode as input, and for each of a plurality of timesteps within the upcoming time period, a state for a respective LSTM cell, in the plurality of LSTM cells, corresponding to a respective timestep in the upcoming time period.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

Figure 1:
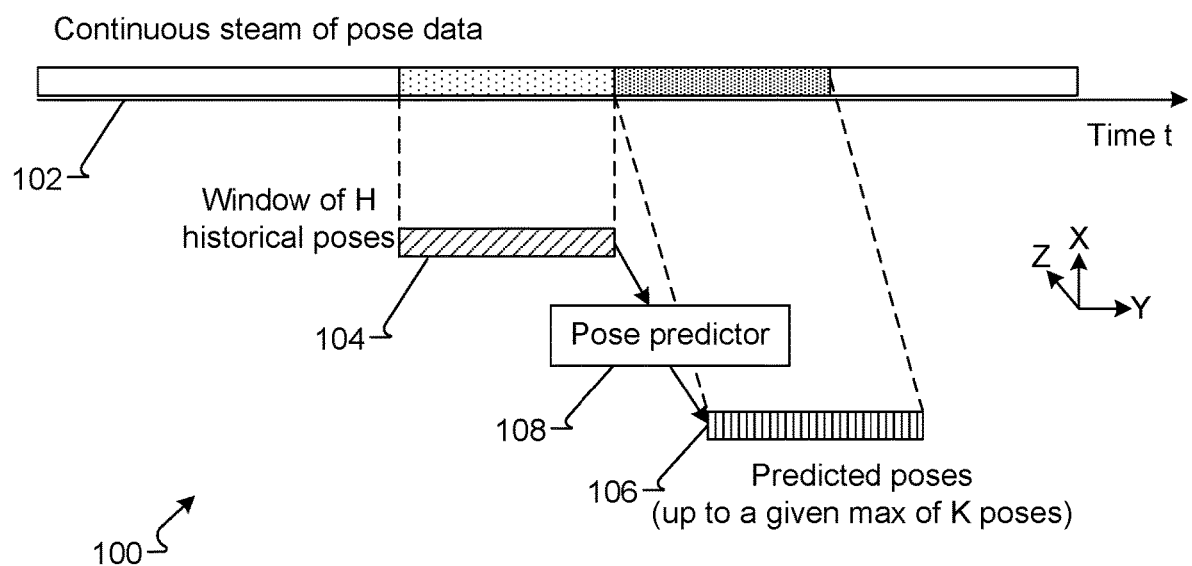
FIG. 1 is an example graph depicting a continuous stream of pose data experienced by a user accessing a Virtual Reality (VR), Augmented Reality (AR) environment, or Mixed Reality (MR) in accordance with implementations described herein.

This document describes example systems and techniques for predicting poses associated with a user accessing a Virtual Reality (VR) experience or Augmented Reality (AR) experience. In particular, the systems and techniques described herein may employ machine learning to model head pose data (e.g., sequential head pose changes), mobile device pose data, hand pose data, or other pose data to improve the accuracy of a predicted pose for an upcoming time period (e.g., an amount of time into the future). In the examples described throughout this document, particular Recurrent Neural Networks (RNNs) may be used to model and predict a pose with improved accuracy for AR/VR applications. The improved accuracy may be attained by using RNNs to reduce prediction error with respect to a changing head position, hand position, device position, etc. of the user and assessing a corresponding pose in particular time intervals.

Because VR/AR applications are interactive, what a user sees can change in response to a determined pose associated with the user (i.e., translation and rotation of the head of the user or of a mobile device held by the user, etc.). The time between the user's head, device motion to the time when corresponding AR/VR content is rendered is defined as Motion-To-Photon (MTP) latency. MTP latency may include any number of MTP intervals. An MTP interval may be defined by any number of time events including, but not limited to a head pose readout time, a content rendering time, a display/rendering time, a transmission time, and/or other time associated with a processing activity. Due to MTP latency, head poses (and poses in general) detected by the system and an actual head pose of the user at display time may not match. The mismatch may result in a perceived lag in depicted content, incorrectly rendered content, and/or simulator sickness for the user accessing the VR/AR application.

The systems and techniques described herein may provide an advantage of improved accuracy and reduction of the perceived errors by predicting the head pose, device pose, hand pose, etc. in an MTP time interval into the future. In particular, the improved head pose prediction algorithms described herein may improve accuracy for applications having a latency of about 30 to about 150 milliseconds. In some implementations, the improved pose prediction algorithms described herein can reduce overshooting a value for a predicted head pose and/or undershooting a value for a predicted head pose, each of which may result in rendering content at an erroneous location and/or time.

In conventional head pose prediction, a constant velocity model may be used to predict head poses. For example, a head pose in the future may be updated based on a velocity and latency time using linear velocity for positional coordinates and angular velocity for rotational coordinates. Such techniques may suffer from low accuracy as latency values increase. Furthermore, in VR headsets, visual information is typically displayed based on the user's head position and orientation in space (e.g., the head pose). However, there is a time delay between the time instant when a user moves their head to the time instant when the visual data is rendered on a screen of a device (e.g., a VR headset, a mobile device, etc.). This delay may be due to different factors including, but not limited to, inertial measurement unit (IMU) readout time, 6DoF tracking time, content rendering time, display scanout time, etc. furthermore, in conventional VR/AR systems where rendering is done on the headset (or on a device tethered to the headset), this delay is typically about 20 milliseconds or less. While the reduction of the delay time itself may be limited, the techniques described herein can reduce the amount of perceived latency by predicting what the head pose of the user will be at or near actual display time.

The systems and techniques described herein can use a user's head pose measurements in the past to predict what the user's head pose will be in a given time interval in the future. For example, the systems and techniques described herein may use recurrent neural networks (RNNs) to model sequence data (e.g., sequential changes of head pose). Such sequence data can be used to predict head pose for a user for an upcoming time period. To do so, the systems and techniques described herein can employ RNN-based neural net cells such as Long-Short Term Memory (LSTM) architectures and Gated Recurrent Unit (GRU) architectures to reduce vanishing gradients while predicting the head pose at a given amount of time into the future. The RNNs may be trained (e.g., modeled and trained) to learn head motion dynamics of the user accessing a particular VR/AR system. The trained RNN model may be used to predict the head pose at the moment when particular AR/VR content would be rendered for display to the user. As detailed below, two architectures will be described for predicting the head pose at a time in the future.

FIG. 1 is an example graph 100 depicting a continuous stream 102 of pose data experienced by a user accessing a virtual reality (VR) or augmented reality (AR) environment, in accordance with implementations described herein. The systems described herein may define a head pose (p) as a 7-dimensional vector that is a concatenation of a 3-dimensional head position vector:

$$u=[u_x,u_y,u_z] \quad [1]$$

and a 4-dimensional (4D) quaternion:

$$q=[q_x,q_y,q_z,q_w] \quad [2]$$

While the pose vector has six degrees of freedom, the pose vector is represented with a 7-dimensional vector due to the quaternion representation of rotation, which includes one redundant dimension. In some implementations and for any given orientation there are two quaternions Q and −Q that represent that orientation. For Mean Square Error (MSE) loss evaluation, and model training/inference, as described throughout this disclosure, a consistent (i.e., continuous) quaternion representation is used to ensure the systems avoid large changes in quaternion representations between consecutive samples. In the examples described herein, the origin of the coordinate system is located at the IMU of a device providing the VR/AR content, yaw is rotation about Y (e.g., the y-axis), pitch is rotation about X (e.g., the x-axis), and roll is rotation about Z (e.g., the z-axis).

The continuous stream 102 of pose data includes a window of (H) previous samples of head pose (e.g., historical pose data) 104. From the (H) previous samples of head pose, the next (K) head poses 106 are predicted at a time shown by pose predictor algorithm 108. In particular, the systems and techniques described herein may predict the (K) head poses 106 before the head poses occur. For clarity purposes, a set of input (H) poses is denoted as:

$$S_{input}=\{x_1,x_2,\ldots,x_H\} \quad [3]$$

and the set of (K) ground truth poses to be predicted as:

$$S_{output}=\{y_1,y_2,\ldots,y_K\} \quad [4]$$

In general, the pose predictor algorithm 108 may represent any or all of the algorithms described below alone, or in combination. As used herein, the term "head pose" may represent a user's head position and/or orientation in world space. As used herein, the term "world space" refers to a physical space that a user inhabits. The systems and techniques described herein may utilize world space to generate and track a correspondence between the physical space and a virtual space in which visual content (e.g., AR content, MR content, etc.) is modeled and displayed. As used herein, MTP latency represents a time used for a user movement to be fully reflected on a display screen. For example, if the time to reflect the user movements on a screen of a VR headset used by the user when the user performs a movement is 100 milliseconds, then the MTP latency is 100 milliseconds.

In some implementations, the implementations described herein may be used in non-VR and non-AR environments. For example, any electronic device or tracking system that utilizes 6-DoF pose tracking may utilize the RNN predictive techniques and networks described herein. For example, a user walking around with a mobile device capturing content with at least one camera may be tracked via the mobile device IMU, for example. The tracking may be used as historical sequence poses or movements that can enable predictive display of content for the user.

Figure 2:
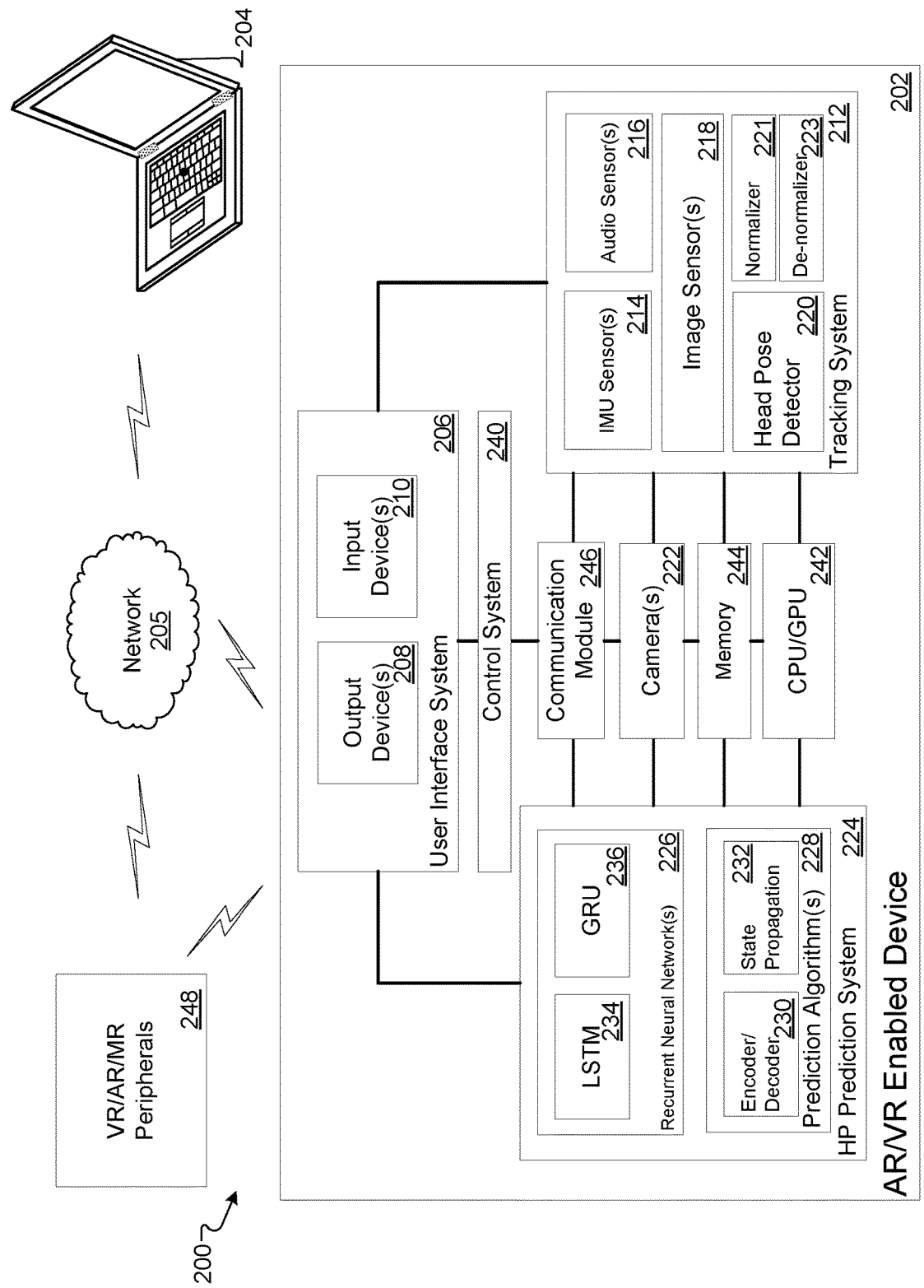
FIG. 2 is a block diagram of an example head pose prediction system for providing VR and/or AR and/or MR experiences, in accordance with implementations described herein.

FIG. 2 is a block diagram of an example head pose prediction system 200, in accordance with implementations described herein. The system 200 may predict a head pose of a user accessing an electronic device, such as AR/VR enabled device 202. As used herein, a pose may refer to a position, an orientation, or both. The head pose prediction system 200 may provide head pose tracking and prediction for the electronic device 202 with respect to a user moving and operating device 202, for example, while accessing VR, AR, and/or MR content in world space.

The AR/VR device 202 is an example electronic device that can generate a virtual reality (VR), an augmented reality (AR), and/or a mixed reality (MR) environment and provide head pose predictions in order to properly render virtual content. The device 202 may be used in world space by a user accessing content (e.g., AR/VR/MR content) provided from a computing device 204 (e.g., server or other device) over a network 205, for example. Accessing content with the AR/VR device 202 may include generating, modifying, moving and/or selecting VR, AR, and/or MR content from computing device 204, from a local memory on AR/VR device 202, or from another device (not shown) connected to or having access to network 205.

As shown in FIG. 2, the AR/VR device 202 includes the user interface system 206. The user interface system 206 includes at least an output device 208 and an input device 210. The output device 208 may include, for example, a display for visual output, a speaker for audio output, and the like. The input device 210 may include, for example, a touch input device that can receive tactile user inputs, a hand controller, a mobile device, a microphone that can receive audible user inputs, and the like.

The AR/VR device 202 may also include any number of sensors and/or devices. For example, the AR/VR device 202 includes a tracking system 212. The system 212 may include (or have access to), for example, light sensors, inertial measurement unit (IMU) sensors 214, audio sensors 216, image sensors 218, head pose detectors 220, normalizers 221, cameras 222, distance/proximity sensors (not shown), positional sensors (not shown), and/or other sensors and/or different combination(s) of sensors. Some of the sensors accessed by system 212 may provide for positional detection and tracking of the AR/VR device 202. Some of the sensors of system 212 may provide for the capture of images of the physical environment for display on a component of the user interface system 206.

The IMU sensor 214 may function to detect or measure, for the AR/VR device 202 or for VR/AR Peripherals 248, an angular velocity and linear acceleration. The system 200 may then calculate and/or estimate a 3D orientation in 3D space based on the measurements taken by the IMU sensor 214. The IMU sensor 214 may include one or more accelerometers, gyroscopes, magnetometers, and other such sensors. In general, the IMU sensor 214 may detect motion, movement, velocity, and/or acceleration of the AR/VR device 202, for example. In some implementations, a pose (e.g., head pose) associated with a user using the AR/VR device 202, for example, may be detected and/or estimated based on data provided by the IMU sensor 214 and/or head pose detector 220. Based on the estimated pose, the system 200 may update content depicted on the screen of AR/VR device 202 to reflect a changed pose of the AR/VR device 202 as the device is moved, for example. In some implementations, the estimated pose may be combined with algorithms and other data to predict a future pose and/or head pose using head pose prediction system 224, for example.

The image sensors 218 may detect changes in background data associated with a camera capture. The cameras 222 may include a rear-facing capture mode and a front-facing capture mode. In some implementations, the cameras 22 may instead include a single camera, as in a mobile device/smartphone. The front-facing capture mode may capture the user including any background scenery. The system 200 may be used to detect pose changes as the user moves with AR/VR device 202 and to properly depict AR/VR content in a location corresponding to the pose changes.

The AR/VR device 202 may also include a head pose prediction system 224. System 224 may include (or have access to) one or more recurrent neural networks (RNNs) 226, prediction algorithms 228, including but not limited to encoder/decoder model 230 and state propagation model 232.

The RNNs 226 may utilize an internal state (e.g., memory) to process sequences of inputs, such as a sequence of a user moving and changing a head pose when in an AR/VR experience. In some implementations, the RNNs 226 may be a finite impulse recurrent network or an infinite impulse recurrent network. In some implementations, the RNNs 226 may be deep RNNs with multiple layers. The RNNs 226 may include one or more of an LSTM architecture 234 or a GRU architecture 236. In some implementations, the system 200 may use both architectures 234 and 236 based on determining which architecture reduces errors and/or latency. The prediction algorithms 228 may include the encoder/decoder model 230 and the state propagation model 232, each of which are described in detail in FIGS. 4-10 below.

The neural networks 226 may include detectors that operate on images to compute, for example, head pose locations to model predicted locations of the head as the head moves in world space. In addition, the neural networks 226 may operate to compute head pose locations several timesteps into the future.

The AR/VR device 202 may also include a control system 240. The control system 240 may include, for example, a power control device, audio and video control devices, an optical control device, and/or other such devices and/or different combination(s) of devices.

Each of the systems 206, 212, 224, and 240 may include more, or fewer, devices, depending on a particular implementation. The AR/VR device 202 may also include one or more processors (e.g., CPU/GPU 242 in communication with the user interface system 206, the systems 212 and 228, control system 240, memory 244, cameras 222, and a communication module 246. The communication module 246 may provide for communication between the AR/VR device 202 and other external devices. Processors 242 are configured to execute instructions (e.g., computer programs) in order to carry out specific tasks. In some implementations, at least one of the processors 242 executes instructions to identify (e.g., predict) a head pose associated with a user and/or AR/VR device based on data determined from the head pose prediction system 224 and the tracking system 212. Memory 244 may be utilized throughout communications and interactions amongst the elements in system 200.

In addition, AR/VR device 202 may use or have access to one or more VR/AR/MR peripherals 248. Example peripherals 248 may include any number of controllers, computing devices, head-mounted display devices, cameras, speakers, tracking systems, and/or other device in communication with AR/VR device 202.

In some implementations, the predictive algorithms and RNNs described herein may be executed and/or utilized on a server system and inputs and/or outputs may be streamed or otherwise provided over a network 205, for example, for use in generating pose predictions. In some implementations, the predictive algorithms and RNNs described herein may be executed and/or utilized at a mobile device system and inputs and/or outputs may be generated by the mobile device system for use in generating pose predictions.

Figure 3:
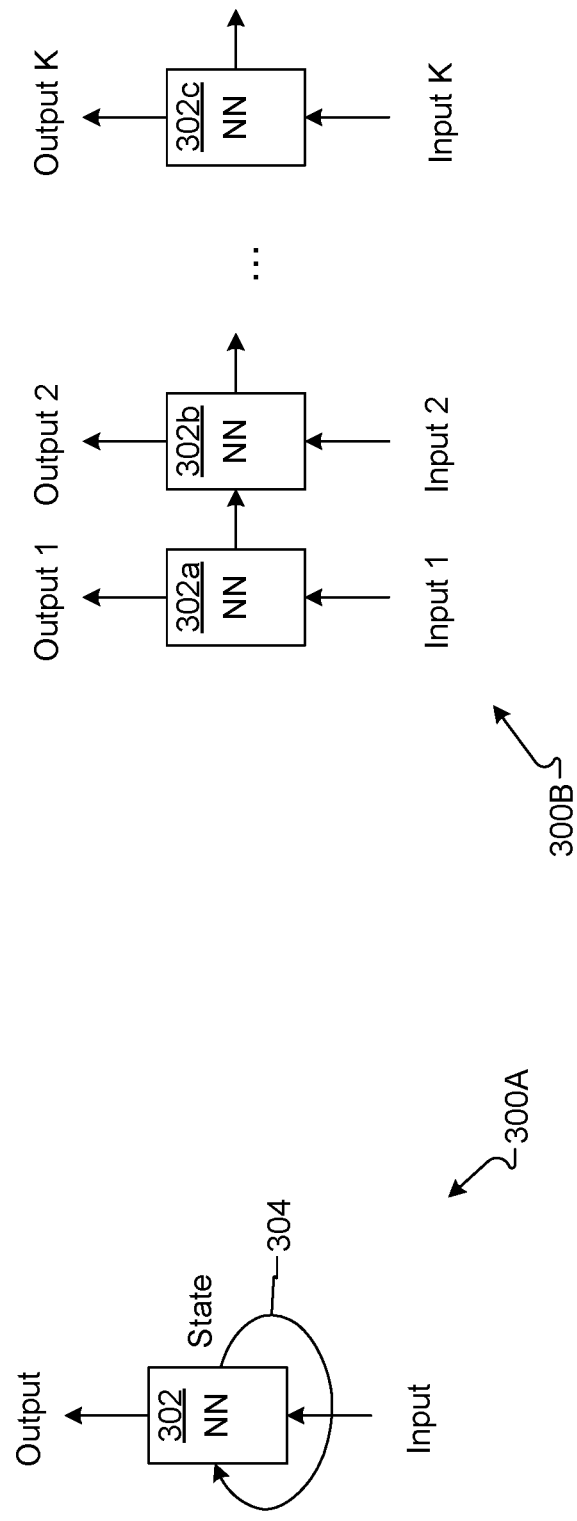
FIGS. 3A-3B are example diagrams illustrating recurrent neural nets, in accordance with implementations described herein.

FIGS. 3A-3B are diagrams illustrating example recurrent neural nets (RNNs) 300A and 300B, in accordance with implementations described herein. As shown in FIG. 3A, an RNN 300A is depicted in a collapsed form where a state is fed back into the neural network 302, as shown by arrow 304. As shown in FIG. 3B, the RNN of FIG. 3A is shown in an unrolled form as RNN 300B. The RNN 300B is the same network as RNN 300A but is instead unfolded for (K) timesteps. Accordingly, the parameters inside each neural network cell 302 (or 302a, 302b, 302c) are the same across all timesteps.

RNNs may exhibit vanishing gradients during a model training phase because of the inherent recurrency of the network. As such, RNNs may have difficulty learning long-range dependencies. Thus, the systems and techniques described herein may utilize RNN-based neural net cells (e.g., cell 410 in FIG. 4) such as Long-Short Term Memory (LSTM) architectures and Gated Recurrent Unit (GRU) architectures to modulate the flow of information through the cell via units called gates. Such architectures may have input, output, and forget gates, each of which may include parameters that are also learned during a training phase. The LSTM RNNs or GRU RNNs may function as a computing device to process a sequence of head pose data. The sequence can enable the systems described herein to learn head motion dynamics for a particular user. The head motion dynamics and the sequence may be used to predict head pose for the user at least one MTP (motion-to-photon) interval (e.g., time interval) into the future.

In some implementations, the system 200 may predict head pose one or more MTPs into the future. The system 200 may utilize RNNs to learn head motion dynamics of a user operating virtual reality equipment in an AR/VR environment. In some implementations, the system 200 may train RNNs to learn predictive information for a particular application. In some implementations, the system 200 may train RNNs to learn predictive information for each AR/VR application available for the environment. In some implementations, the system 200 may train the RNNs to learn predictive information for a particular user. In some implementations, the system 200 may train RNNs to learn predictive information for particular AR/VR applications and/or games, which may have different head pose statistics and network parameters for each application and/or game (or a class of application and/or game) and the RNNs can learn the different statistics and parameters.

Figure 4:
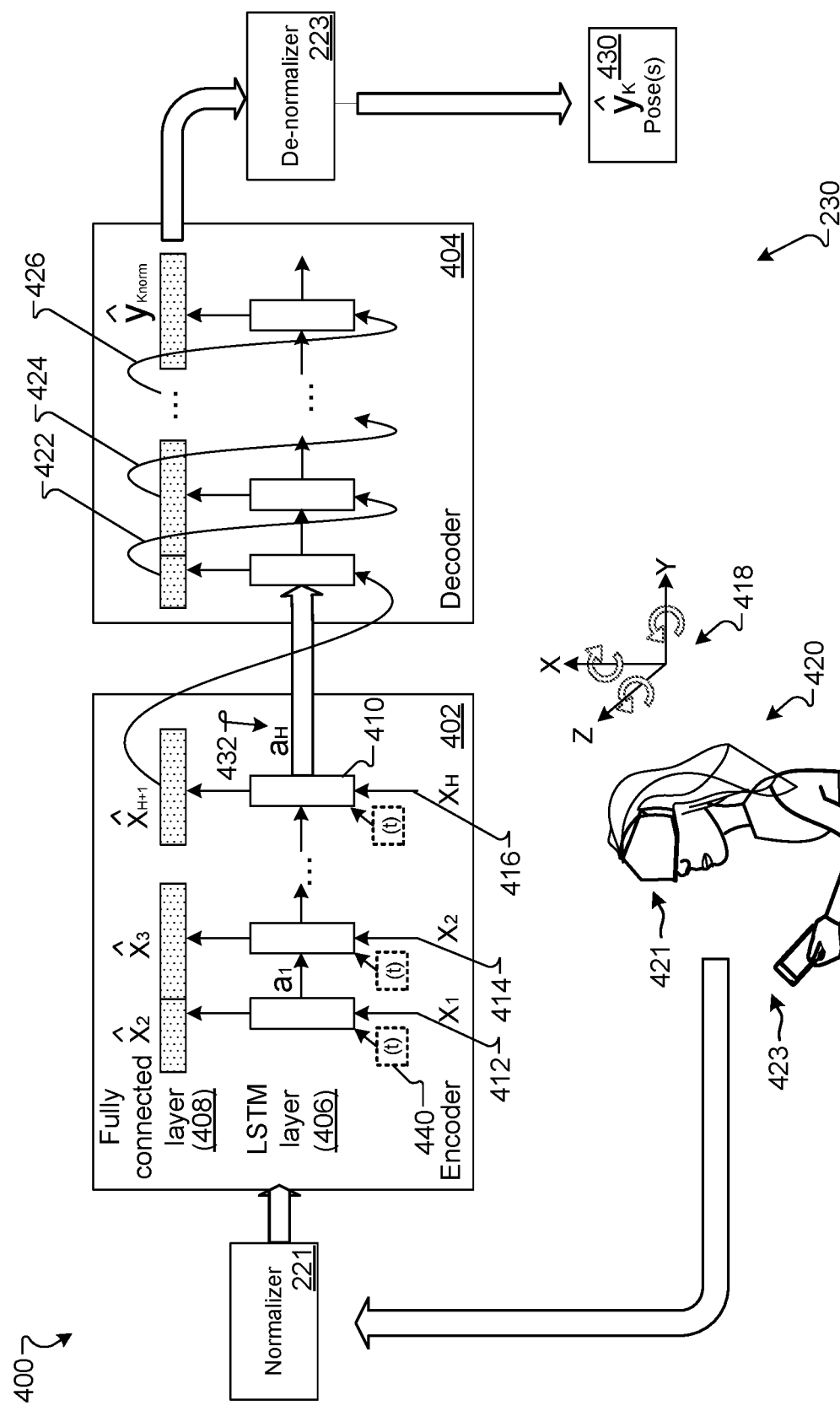
FIG. 4 is an example model architecture for a head pose prediction system, in accordance with implementations described herein.

FIG. 4 is an example model architecture 230 for a head pose prediction system, in accordance with implementations described herein. The model architecture 230 may represent an inference graph for the encoder/decoder model 230. In some implementations, the model architecture 230 utilizes model hyperparameters including, but not limited to, a number of activation units (e.g., cells) in LSTM ($N_a$), a history size/number of samples (H), a number of prediction steps (K), and a learning rate.

As shown, model architecture 230 includes an encoder portion 402 and a decoder portion 404. The encoder portion 402 includes at least an LSTM layer 406 and a fully connected layer 408. The LSTM layer 406 is connected to the fully connected layer 408. Each LSTM cell (e.g., cell 410) includes a number $N_a$ of active units in the RNN, where the subscript "a" represents the state tensor. The fully connected layer 408 generates a number $\hat{x}_H$ outputs (e.g., outputs $x_1$ (412), $x_2$ (414), $x_H$ (416)) and a number of features ($N_f$) of the output which correspond to seven outputs corresponding to the number of pose features. Such outputs $x_1$ (412), $x_2$ (414), $x_H$ (416)) may be provided as input to the LSTM layer 406.

The encoder portion 402 includes state vectors $a_1$, $a_2$, $a_3$ . . . , corresponding to historical pose data. The historical pose data includes the pose samples $x_1, x_2, \ldots x_H$, which are collected from historical head positions or device poses 418 of a user 420. The output of the encoder portion 402 represents the state of the LSTM cell $a_H$ (e.g., cell 410) and the first predicted sample $\hat{x}_{H+1}$.

In some implementations, the system 200 may collect the historical head pose data using a uniform time sample. For example, the head pose detector 220 may detect the head pose of the user as the user moves, but the head pose prediction system 224 may use a portion (e.g., a sampling) of the head poses. The head pose prediction system 224 may then sample the head poses at a uniform sampling rate. For example, the head pose prediction system 224 may sample at about two to about five milliseconds between samples.

In some implementations, the head pose prediction system 224 may use a non-uniform sampling rate. For example, the head pose prediction system 224 may sample a portion of the head poses at a first sampling rate (e.g., 0.5-1.5 milliseconds) and sample a second portion of the non-head poses at a second sampling rate (e.g., 90-110 milliseconds). Such sampling rates may be provided as an input of time to each cell, as shown by optional time inputs (t) (e.g., (t) 440). In some implementations, non-uniform sampling refers to when the data is attempted to be sampled at a uniform rate, but due to noise and other contributors, the samples are not exactly uniformly spaced. The input to the system is then a timestamp for each pose, which differ from uniform timestamps.

Referring again to FIG. 4, the output a 432 and the first predicted sample $R+_1$ are passed to the decoder portion 404. The decoder portion 404 may represent the same LSTM cell and fully connected layer 408 layer unfolded to a predefined number of prediction steps, minus one that is already predicted by the encoder portion 402. In some implementations, the encoder portion 402 and the decoder portion 404 may function as a single RNN. The state output of the encoder (e.g., $a_H$) includes the encoded history of the head poses already collected (i.e., the historical pose data). The decoder portion 404 may receive the state output of the encoder portion 402 (e.g., $a_H$) and may iterate the state to decode (e.g., determine) the next prediction poses. For example, each time an input is provided to a cell in decoder portion 404, the calculated output may be fed back into the next cell, as shown by feedback loops 422, 424, and 426.

In operation of model architecture 230 (using hardware and software defined in FIG. 2), the user 420 may provide head pose input (e.g., movements 418) by moving VR headset 421 during a VR/AR experience. Alternatively, or in addition to the head movements, the user may move or use mobile device 423 according to movements 418. The architecture 230 may utilize head pose input from the VR headset 421 and/or pose input obtained from mobile device 423. For example, the user 420 may access a VR/AR device (e.g., a head mounted display, a mobile device, or other virtually-enabled device) to generate head poses while experiencing VR/AR content. The model architecture 230 (in combination with system 200) may collect the head pose data by tracking means or other sensing means. The collected head pose data (or pose data, in general) may be normalized by normalizer 221 and provided to encoder portion 402 for use as historical pose data. In general, normalization may include taking a mean and a variance of a number of historical pose data samples collected over a particular window of time. Such normalization may ensure that the pose predictions are adaptable to changes of pose occurring during a live AR/VR experience.

Thus, the encoder portion may utilize input head poses from actual historical user head poses in a particular VR/AR experience in order to predict future head poses. The historical head poses may be normalized and fed directly into the LSTM layer (in each cell) 406 for each timestep. By contrast, since the decoder portion 404 does not have input poses (i.e., the input poses are yet to be predicted), the model architecture 230 feeds each predicted pose back from a previous timestep into the next cell of the LSTM layer, as illustrated by feedback loops 422, 424, and 426. Although particular inputs/outputs are depicted, any number of inputs/outputs may be used by model architecture 230, as indicated in various places by an ellipses.

In general, input head pose includes a head position and a head rotation represented by a quaternion, as described above. The ranges of position values can vary depending on the user's position in the AR/VR environment. Such ranges are different from quaternion values that are typically between zero and one. Therefore, input features have different ranges, and different statistics in general. For example, rotation in yaw typically has more variance than head roll). Therefore, data features are normalized to ensure the system 200 can learn to efficiently approximate and/or predict all features.

To normalize such data features, a normalizer 221 is configured to normalize historical head pose data $x_1, \ldots, x_H$. For example, normalization is performed on each input pose history vector $x_1, \ldots, x_H$, for each input provided to model architecture 230, for example. This normalization is applied to the historical pose data that is provided at inference time and/or for training. The normalizer 221 may use CPU/GPU 242 and memory 244 to normalize each input (historical head pose history vector) to zero mean and unit variance for each feature in the historical pose data. In some implementations a Min/Max normalization is used to range (min, max)=(0,1) where min and max are evaluated based on the historical pose data (e.g., samples $x_1, \ldots, x_H$). In some implementations a Mean/Var normalization is used to zero mean and unit variance, where mean and variance are evaluated based on the historical pose data (e.g., samples $x_1, \ldots, x_H$). A de-normalizer 223 can then use those mean and variance values to apply inverse normalization to a normalized output (e.g., $\hat{y}_k^{norm}$) and obtain the predicted output poses (e.g., $\hat{y}_k$) 430.

For training loss, the system 200 may use a mean square error (MSE) loss on the head pose (e.g., position and rotation). In some implementations, the system 200 may use a mean absolute error on the head pose (e.g., position and rotation). In some implementations, the system 200 may use a weighted mean square error, where each output step of the LSTM layer 408 (corresponding to different latencies) can be weighted differently. This can be used, for example, when the histogram of typical latencies is not uniform, but there are some latencies that are more common than others. In some implementations, the system 200 may use a mean square error for position and angular error for rotation. In some implementations, the system 200 may use a loss function based on the location of virtual camera positions (e.g., corresponding to eye locations). This loss value combines the position and rotation error into one 3D position measure (e.g., 3D position of the eyes).

Figure 5:
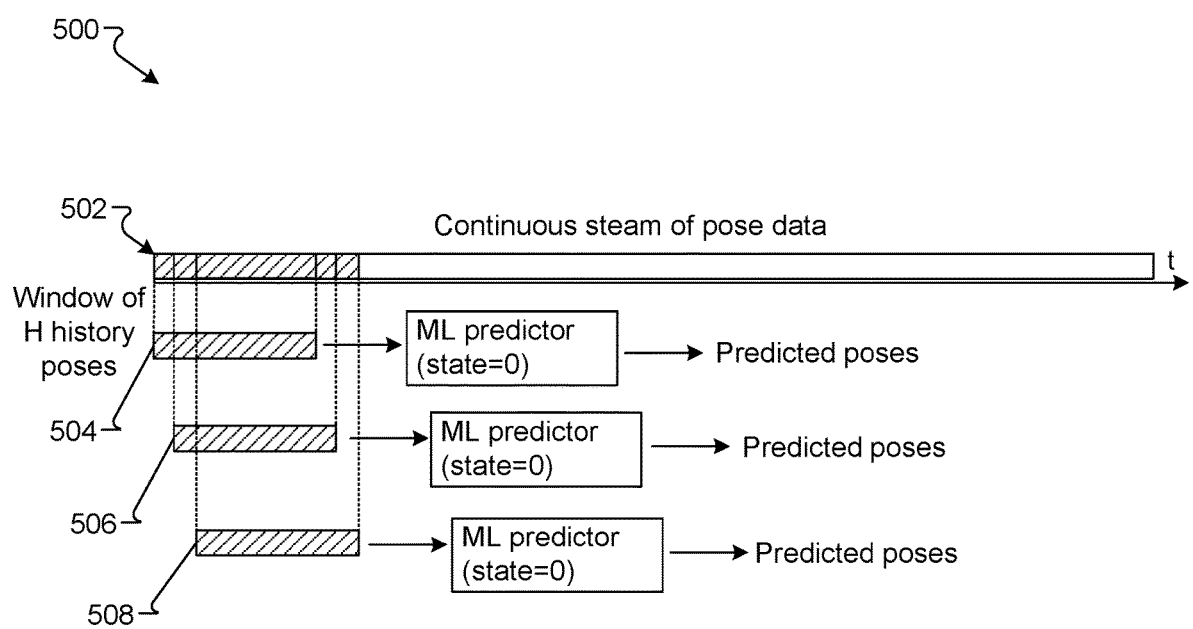
FIG. 5 is an example graph depicting sequential sample selection during inference using the model of FIG. 4, in accordance with implementations described herein.

FIG. 5 is an example graph depicting sequential sample selection during inference using the model 230 of FIG. 4, in accordance with implementations described herein. The sampling approach shown in graph 500 may be used during inference. In the model 230, a window 502 of (H) history poses is used to predict poses in the future. In operation, the input state of the LSTM cell is initialized to zero. Each time a window is selected for the next set of samples (e.g., window 504, window 506, and window 508 in this example), the system 200 again initializes the state to zero. Initializing the state to zero ensures that the memory of each particular cell is not propagated from one window sample to another. This approach enables system 200 to use history normalization per window of samples, as described in FIG. 4 above.

Figure 6:
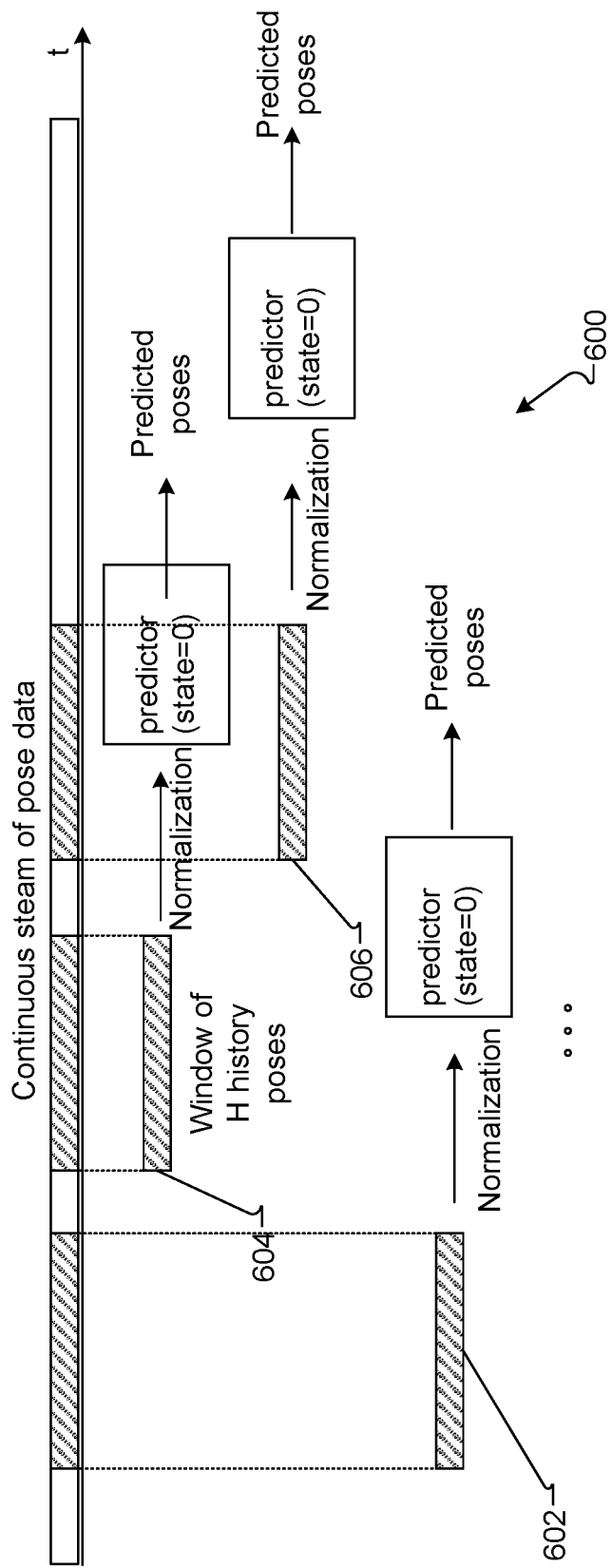
FIG. 6 is an example graph depicting random sample selection during training of the model of FIG. 4, in accordance with implementations described herein.

During training, the system 200 can randomly select data samples (and their H history) at each iteration, to achieve uniform coverage of the training dataset at each iteration. FIG. 6 is an example graph 600 depicting the random sample selection during training of the model of FIG. 4. For example, the random selection and/or access of samples may be from a pose trace along with zero state initialization for each sample. Each window of samples can be independently executed using the model 230. Due to this independence, the model 230 can be run on randomly accessed windows of samples, or on successively accessed windows of samples, but in both cases the state is initialized to zero.

As shown in graph 600, system 200 may randomly select windows of data samples (e.g., window of data samples 602, window of data samples 604, and/or window of data samples 606). For each window of samples, the system 200 may normalize the samples using normalizer 221. The predictor state may then be set to zero and the head pose prediction system 224 can predict the next poses in the future by implementing LSTM architecture 234 or GRU architecture 236 for either encoder/decoder model 230 or state propagation model 232.

Figure 7:
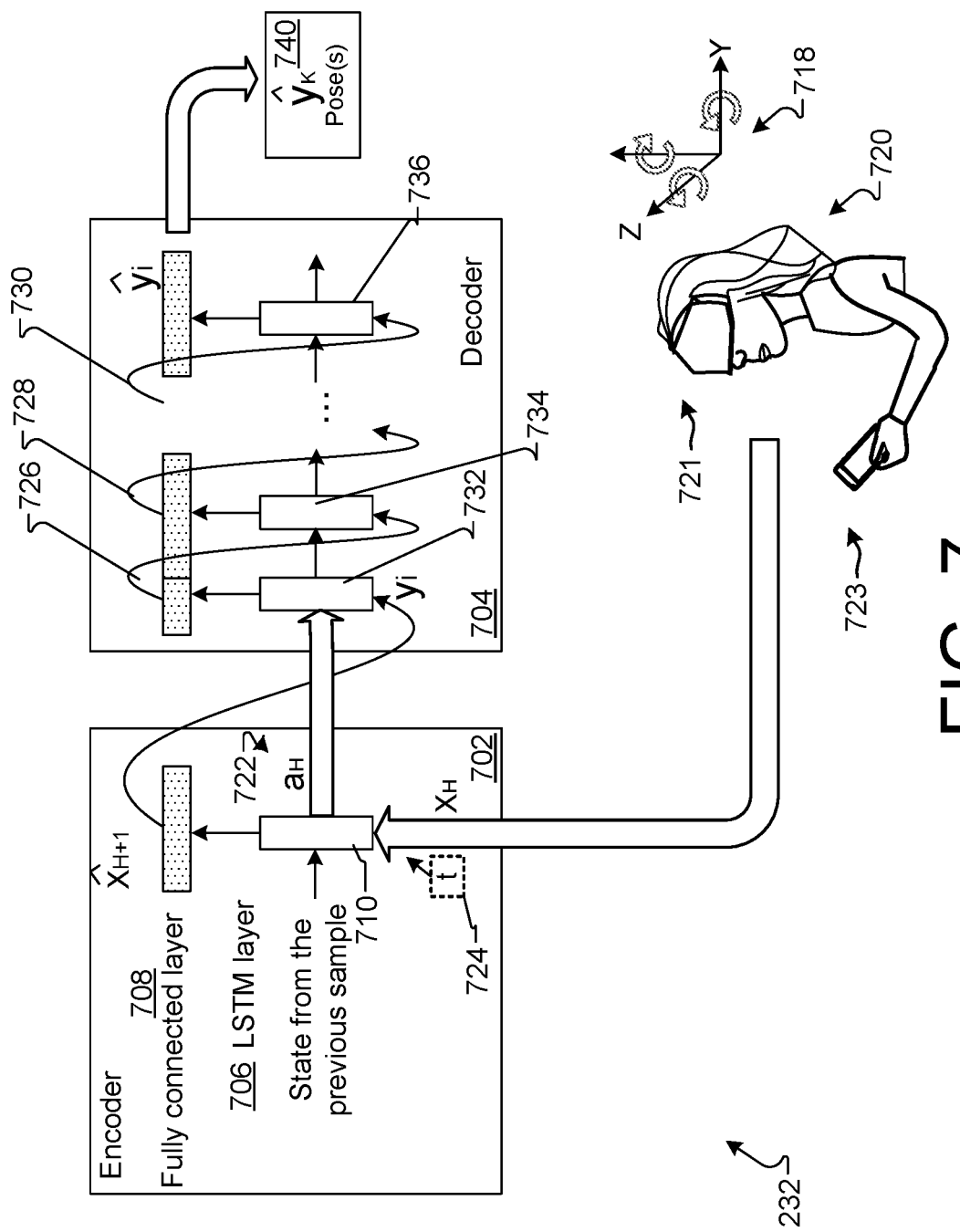
FIG. 7 is an example model architecture for a head pose prediction system, in accordance with implementations described herein.

FIG. 7 is an example model architecture 232 for a head pose prediction system, in accordance with implementations described herein. The model architecture 232 may represent an inference graph for the state propagation algorithm 232. In some implementations, the model architecture 232 utilizes model hyperparameters including, but not limited to, a number of activation units (e.g., cells) in LSTM ($N_a$), a history size/number of samples (H), a number of prediction steps (K), and a learning rate.

As shown, model architecture 232 includes an encoder portion 702 and a decoder portion 704. The encoder portion 702 includes at least an LSTM layer 706 and a fully connected layer 708. The LSTM layer 706 is connected to the fully connected layer 708. Each LSTM cell (e.g., cell 710) includes a number $N_a$ of active units in the RNN, where the subscript "a" represents the state tensor.

The fully connected layer 708 generates a number xH outputs (e.g., $x_1$ (412), $x_2$ (414), $x_H$(416)) and a number of features $N_f$ of the output which correspond to seven outputs corresponding to the number of pose features. The input to the decoder $\hat{x}_{H+1}$ considers a state $a_H$ obtained by running encoder on a previous sample $\hat{x}_H$. The encoder portion 702 includes at least one collected head pose sample $\hat{x}_H$ (e.g., historical pose data). The historical pose data is based on one or more input samples of user head poses collected from historical head positions/movements 718 of a user 720. The output of the encoder portion 702 represents the state of the LSTM cell $a_H$ 722 (e.g., at cell 710) and the predicted sample(s) $\hat{x}_{H+1}$.

In some implementations, the system 200 may collect the historical head pose data for model architecture 232 using a uniform time sample. For example, the head pose detector 220 may detect the head pose of the user 720 as the user 720 moves, but the head pose prediction system 224 may use a portion (e.g., a sampling) of the head poses. The head pose prediction system 224 may then sample the head poses at a uniform sampling rate. For example, the head pose prediction system 224 may sample at about two to about fifteen milliseconds between samples.

In some implementations, the head pose prediction system 224 may use a non-uniform sampling rate. For example, the head pose prediction system 224 may sample a portion of the head poses at a first sampling rate (e.g., 0.5-1.5 milliseconds) and sample a second portion of other poses at a second sampling rate (e.g., 90-110 milliseconds). Such sampling rates may be provided as an input of time to each cell, as shown by optional time inputs (t) (e.g., (t) 724). In some implementations, non-uniform sampling refers to when the data is attempted to be sampled at a uniform rate, but due to noise and other contributors, the samples are not exactly uniformly spaced. The input to the system is then a timestamp for each pose, which differ from uniform time-stamps.

In contrast to model architecture 230, which resets a state to zero for each sample, the model architecture 232 considers a state from a previous historical head pose sample. For example, in the model architecture 230, a window of H historical head poses is collected to predict poses in the future. The input state of LSTM architecture is initialized to zero for each sample without considering other samples. When the window is selected for the next sample, the state is initialized to zero. That is, the memory of the cell is not propagated from one window sample to another. This approach allows the system 200 to use history normalization per sample, as described above. In the model architecture 232 the LSTM state is instead propagated from one sample to the next sample, and not always initialized to zero. To do so, the system 200 may select and/or access samples successively within a given head pose trace. In this example use of model architecture 232, the state is initialized to zero at the beginning of the entire head pose trace. In some implementations, the model architecture 232 and systems described herein may have to reset the state, for example, when the system loses tracking data or if an app/session is paused by the user.

Referring again to FIG. 7, the state $a_H$ 722 and the first predicted sample $\hat{x}_{H+1}$ are passed to the decoder portion 704. The decoder portion 704 may represent the same LSTM cell and fully connected layer 708 layer unfolded to a predefined number of prediction steps, minus one that is already predicted by the encoder portion 702. In some implementations, the encoder portion 702 and the decoder portion 704 may function as a single RNN. The state output of the encoder (e.g., $a_H$ 722) includes the encoded history of the head poses already collected (i.e., the historical pose data). The decoder portion 704 may receive the state output of the encoder portion 702 (e.g., $a_H$ 722) and may iterate the state to decode (e.g., determine) the next prediction poses. For example, each time an input is provided to a cell in decoder portion 704, the calculated output may be fed back into the next cell, as shown by feedback loops 726, 728, and 730.

In operation of model architecture 232 (using hardware and software defined in FIG. 2), the user 720 may provide head pose input (e.g., movements 718) by moving VR headset 721 during a VR/AR experience. Alternatively, or in addition to the head movements, the user may move or use mobile device 723 according to movements 718. Architecture 232 may utilize head pose input from the VR headset 721 and/or pose input obtained from mobile device 723. For example, the user 720 may access a VR/AR device (e.g., a head mounted display, a mobile device, or other virtually-enabled device) to generate head poses while experiencing VR/AR content. The model architecture 232 (in combination with system 200) may collect the head pose data by tracking means or other sensing means.

The encoder portion 702 may utilize input head poses from actual historical user head poses in a particular VR/AR experience in order to predict future head poses. The historical head poses may be fed directly into the LSTM layer (e.g., in each cell 732, 734, 736, etc.) for each timestep. Since the decoder portion 704 does not have input poses (i.e., the input poses are yet to be predicted), the model architecture 232 feeds each predicted pose back from a previous timestep into the next cell of the LSTM layer, as illustrated by feedback loops 726, 728, and 730. Although particular inputs/outputs are depicted, any number of inputs/outputs may be used by model architecture 232, as indicated in various places by an ellipses.

The decoder 704 may use any number of LSTM cells (e.g., cell 732) to generate head pose predictions. For example, each LSTM cell may represent a portion of time over a total time (t) in which a prediction may be requested by system 200. That is, if the total time may represent a time at which a prediction is requested (e.g., ten milliseconds into the future), then a prediction may be performed at each LSTM cell at a particular timestep (e.g., every three milliseconds).

The system 200 may provide a head pose prediction (or hand pose position from mobile device 723) $\hat{y}_K$ 740 to provide a prediction at a known end of the total time (t) in the future. In some implementations, a user or system 200 may output an intermediate head pose as $\hat{y}_K$ 740, if for example, it is determined that the head pose prediction is requested for less than the total time (t).

In general, input head pose includes a head position and a head rotation represented by a quaternion, as described above. The ranges of position values can vary depending on the user's position in the AR/VR environment. Such ranges are different from quaternion values that are typically between zero and one. Therefore, input features have different ranges, and different statistics, in general.

Similarly, input pose (e.g., hand pose, mobile device pose) may include a position and a rotation represented by a quaternion, as described above. The ranges of position values can vary depending on the user's device or hand position in the AR/VR environment. Such ranges are different from quaternion values that are typically between zero and one. Therefore, input features have different ranges, and different statistics, in general.

Unlike with model architecture 230, model architecture 232 does not normalize on a per sample window basis. Instead, the model architecture 232 may build a model that includes input for both position and rotation while using a loss function that balances losses in both position and rotation. In some implementations, the model architecture 232 may build two models. For example, the model architecture may use a model for position and a model for rotation. Each model may be trained separately.

The architecture model 232 may be configured to ensure temporal stability and thus low jitter between outputted head pose calculations. For example, model 232 uses the output state $a_H$ 722 of the LSTM cell 710 as input to the cell in the next pose sample (i.e., when a new history window is captured). The LSTM state keeps internal memory from previous pose samples, so it naturally enforces temporal stability. Model architecture 232 is configured to propagate the LSTM input state from one window sample to the next window sample. This difference has implications on how samples are selected for training and inference.

Thus, in some implementations, the model architecture 232 may provide an advantage of temporal stability to the predictions, which may lead to less jitter in presented output (e.g., image content, camera feed, etc.) for the user. The model architecture 232 may also be executed with lower computational complexity than model architecture 230. For example, the model architecture 232 executes one encoder LSTM step at each newly received head pose sample, while model architecture 230 executes H encoder LSTM steps for each new head pose sample. Both model architectures 230 and 232 execute K decoder LSTM steps.

In some implementations, the model architecture 230 provides more jitter, but provides an advantage of leading to lower mean square error than the model architecture 232. In addition, since model architecture 232 may not perform normalization on position coordinates, etc., any change in the coordinate system position from the data collected in the VR headset may have to be pre-processed to determine an appropriate head pose. In some implementations, the model architecture 232 may perform normalization by normalizing all samples with the same parameters (e.g., global normalization).

In order to reduce jitter, additional terms may be introduced into the loss function for the model architecture 232. The loss function in the model architecture 232 may include at least three terms including, but not limited to, a prediction error term, a smoothness term, and a pose change term.

In particular, the loss function may include a prediction error term that is either determined using a mean absolute error technique or determined using a mean square error technique. In the model architecture 232, output from both the encoder portion 702 and the decoder portion 704 is used for each LSTM step. Such a loss term is defined as shown in equation [5]:

$$\mathcal{L}_{abs} = \frac{1}{H+K}\left[\sum_{i=2}^{H+1}|x_i - \hat{x}_i| + \sum_{i=1}^{K}|y_i - \hat{y}_i|\right] \quad [5]$$

where the two sum terms correspond to outputs of LSTM cells (in encoder 702 and decoder 704), respectively. The (H) value represents a number of samples taken over a particular total history duration time. For example, (H)=20 if a total history time is 100 milliseconds and the samples are spaced at 5 milliseconds. The (K) value represent a number of predicted samples. For example, if a total prediction time is 100 milliseconds, the number of predicted samples at 5 millisecond spacing is 20 samples. The ($x_i$) value represents input at the encoder 702 and the ($\hat{x}_i$) value represents output at the encoder 702. The ($y_i$) value represents the ground truth pose values at prediction times, and the ($\hat{y}_i$) value represents output at the decoder 704.

In addition, the model architecture 232 may include a term for a smoothness cost, which represents a mean of absolute differences between predicted successive head pose samples, as shown in equation [6]:

$$\mathcal{L}_{smooth} = \frac{1}{H+K-1}\left[\sum_{t=2}^{H+1}|\hat{x}_t - \hat{x}_{t-1}| + \sum_{t=1}^{K}|\hat{y}_t - \hat{y}_{t-1}|\right] \quad [6]$$

where $\hat{y}_0 = \hat{x}_{H+1}$.

The model architecture 232 may also include a term for a pose change cost, which represents a difference between each predicted pose at the decoder 704 and the last known true pose at the encoder 702 (e.g., at (H)). This cost may provide the advantage of enabling reduction of overshooting and undershooting of a predicted pose because the pose change cost term ensures that the new pose is within a particular range of a last known pose. The pose change cost may be represented as shown in equation [7]:

$$\mathcal{L}_{pc} = \frac{1}{K+1}\sum_{t=0}^{K}|\hat{y}_t - x_H| \quad [7]$$

where again $\hat{y}_0 = \hat{x}_{H+1}$. In some implementations, the RNN is trained on a database of known pose sequences and the historical pose data is sequential pose data associated with a mobile device executing a VR or AR application.

A term for the total loss using model architecture 232 may be represented as shown in equation [8]:

$$\mathcal{L}_{total} = \mathcal{L}_{abs} + \lambda_1 \mathcal{L}_{smooth} + \lambda_2 \mathcal{L}_{pc} \quad [8]$$

where $\lambda_1$ and $\lambda_2$ can be chosen empirically or may be tuned using machine learning.

Figure 8:
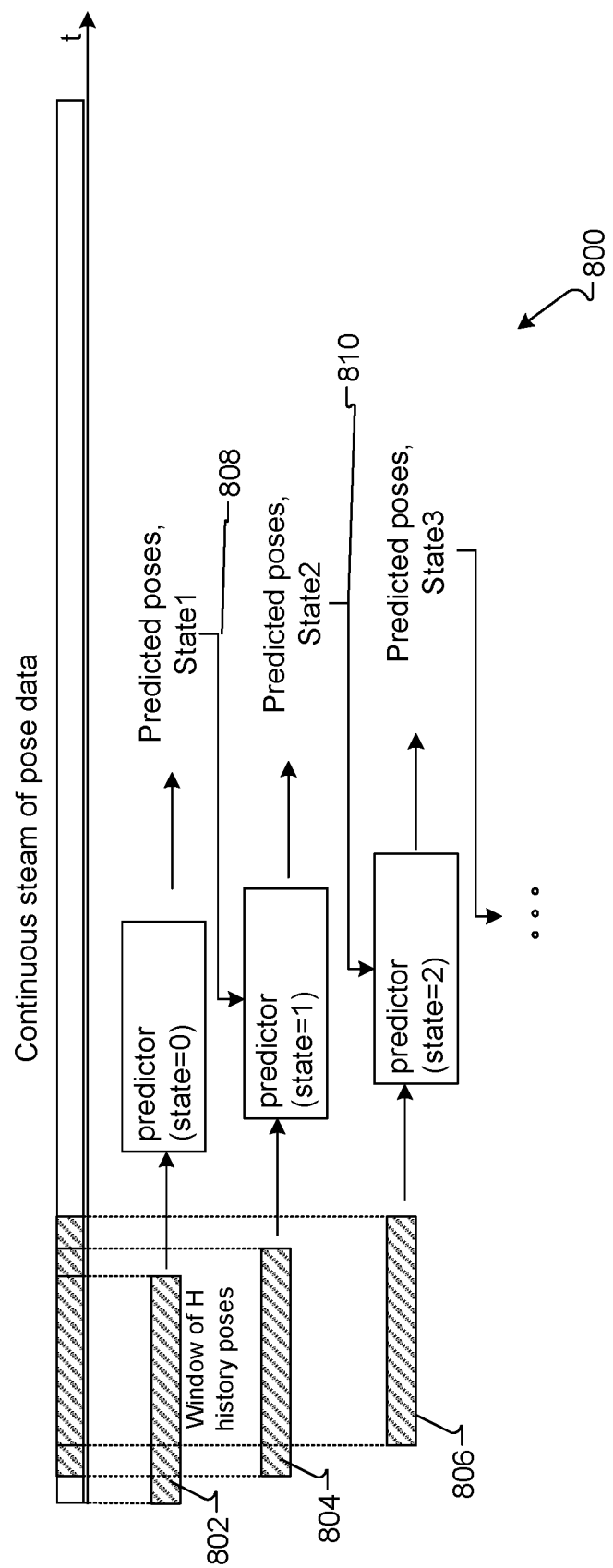
FIG. 8 is an example graph depicting sequential sample selection during training while propagating a prior state using the model of FIG. 7, in accordance with implementations described herein.

FIG. 8 is an example graph 800 depicting sequential sample selection during training while propagating a prior state using the model of FIG. 7, in accordance with implementations described herein. Any number of windows of time may be selected to capture historical head pose data. As shown, the system 200 selected a first time window 802, a second time window 804, and a third time window 806 to obtain historical head pose date for use in training the model architecture 232. Each window may represent a retrieval of historical head pose data that is sampled successively. Therefore, the state of each LSTM is initialized to zero at the beginning of an entire pose trace, but not at each sampling window.

For window 802, a pose may be predicted by initializing the LSTM state to zero. State a 1 from the encoder, after it has processed the window 802, may be passed as the initial state for prediction from window 804, as indicated by arrow 808. Similarly, a state a 1 obtained using historical data from window 804 may be provided as input to a head pose prediction performed for a third window, as indicated by arrow 810. In a similar fashion, any number of head pose predictions may be calculated using additional windows of historical data and obtained states from previous windows as input.

The system 200 may use graph 800 during training of the RNN. When the head poses are predicted, the entire window of historical pose data is utilized in training to ensure that the above recited loss function can be calculated and utilized for determining playback of particular content based on the predicted head poses.

During training of graph 800 for model architecture 232, the system 200 does not perform random access to samples, as can be performed with model architecture 230. Instead, all traces (e.g., head pose samples over a window) can be stacked and training can be executed across that stack. In such an example, a batch size is the number of traces. Each iteration may execute the model in parallel on all traces, but sequentially through samples. Training would complete once all samples are collected.

In some implementations, the traces may be divided into ordered portions of consecutive samples, each of equal size. The system 200 may then initialize the states to zero at the beginning of each portion. The training for model architecture 232 may then parallelize the model training over traces and portions together, leading to a batch size of number of traces x number of portions.

Figure 9:
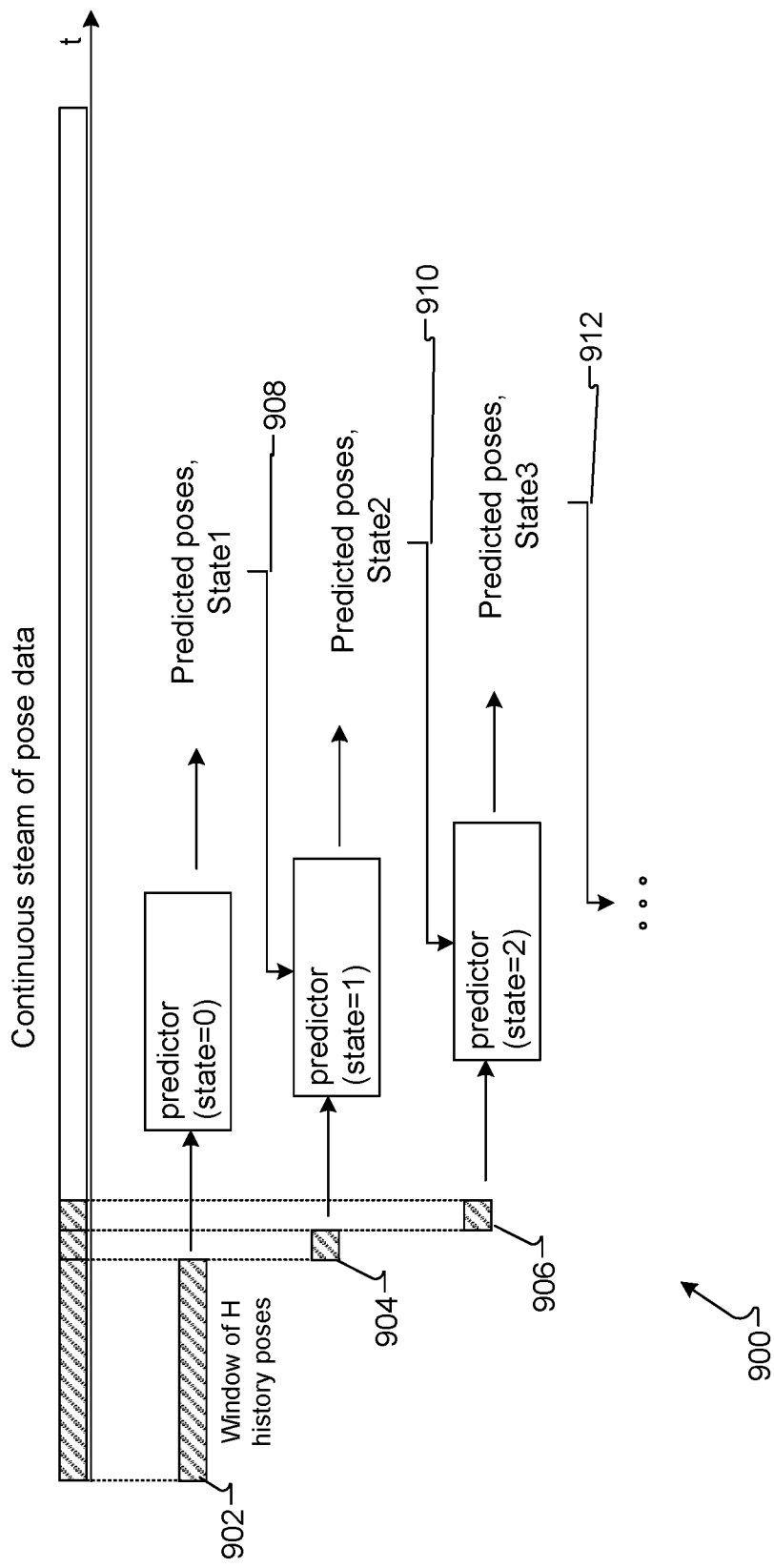
FIG. 9 is an example graph depicting sequential sample selection during inference while propagating a prior state using the model of FIG. 7, in accordance with implementations described herein.

FIG. 9 is an example graph 900 depicting sequential sample selection during inference while propagating a prior state using the model of FIG. 7, in accordance with implementations described herein. In this example, a full window of (H) historical pose data is not obtained because a single LSTM cell is executed for a last sample in the window (i.e., the newest or last received sample). In this inference graph 900, each state is initialized using the respective prior state $a_{H-1}$, as shown by arrows 908, 910, and 912

In some implementations, the models described herein may be applied for controller pose predictions to determine where a user may position and orient any or all of a head, a hand, a mobile device, and/or a AR/VR controller. In some implementations, the systems described herein may combine the head pose predictions with the controller pose predictions to provide improvements in overall predictions due to existing correlations between head movements and controller movements. In some implementations, the models described herein may be applied to video pass-through in augmented reality to correct alignment between real and virtual content, for example. In some implementations, the head pose may not be used, but instead a mobile device pose may be substituted as pose input in the implementations described throughout this disclosure.

Figure 10:
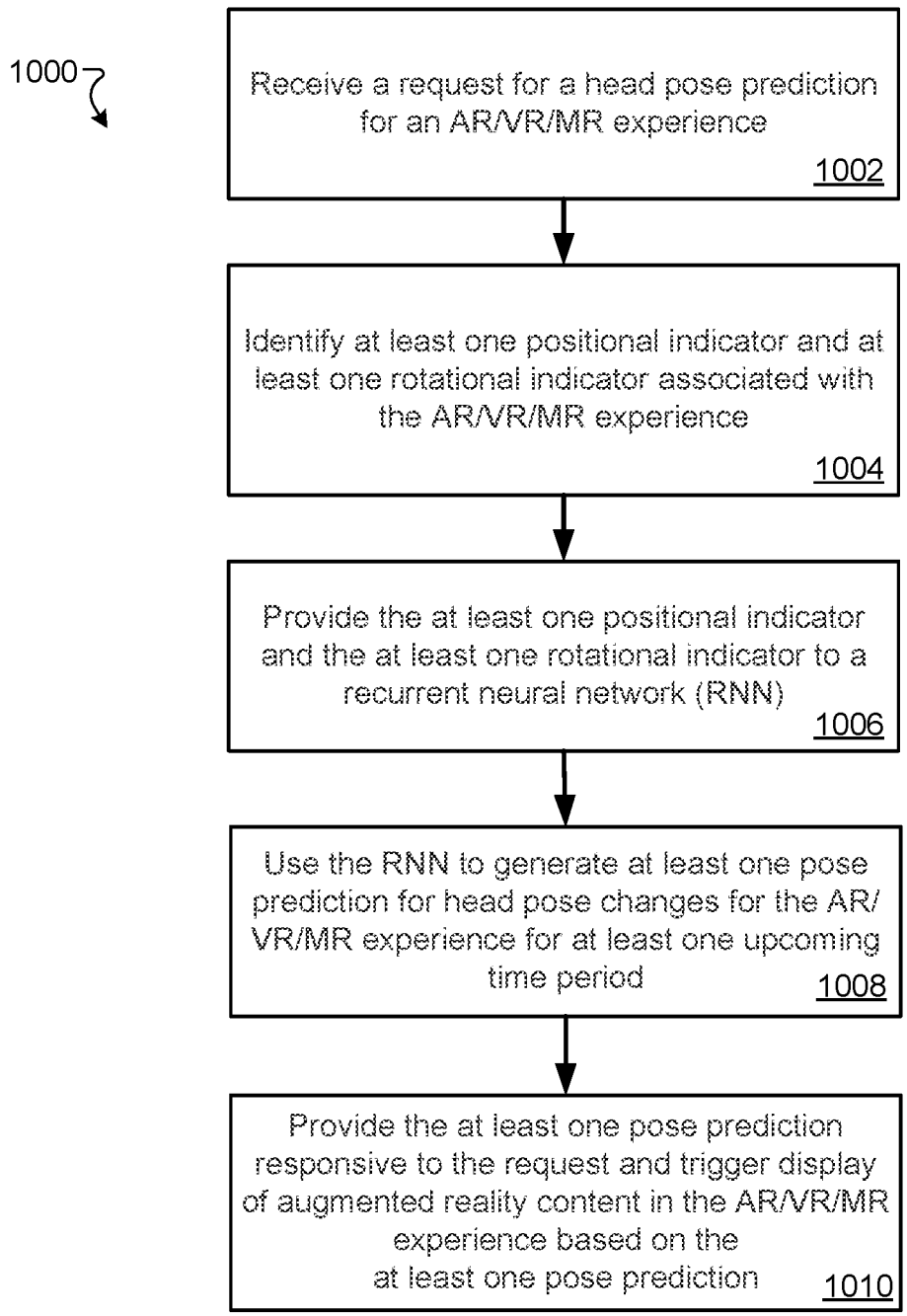
FIG. 10 is a flow chart diagramming an implementation of a process to provide content in an AR or VR or MR experience based on predicted head poses, in accordance with implementations described herein.

FIG. 10 is a flow chart diagramming an implementation of a process 1000 to provide content in an AR or VR experience based on predicted head poses, in accordance with implementations described herein. For example, the process 1000 may predict a pose of the head based on historical head pose data and one or more recurrent neural networks.

In operation of process 1000, a computing device 202 may perform computer implemented processes to predict head poses for a user so that the user receives proper and time-accurate placement of content in the AR environment. In general, the computing device 202 may receive data defining a VR or an AR environment. The VR or AR environment includes a representation of a physical environment. The data may include instructions for rendering and compositing/placing a plurality of objects in the VR or AR environment.

At block 1002, the process 1000 includes receiving a request for a head pose prediction for an augmented or virtual reality experience. For example, a user may be accessing the AR (or VR or MR) environment. The systems being used by the user in the AR or VR environment may benefit from determining user movements, head positions, hand positions, device positions (e.g., mobile device) and/or other trackable metrics. For example, the systems may benefit from receiving predictions of head poses in upcoming (e.g., future) time periods. Accordingly, process 1000 may perform head pose predictions to ensure proper placement and time rendering for displaying content to the user.

At block 1004, the process 1000 includes identifying at least one positional indicator and at least one rotational indicator associated with the AR/VR experience. The at least one positional indicator may be a three-dimensional head position vector, as defined by equation [1] in the description of FIG. 1. The at least one rotational indicator may be a four-dimensional quaternion, as defined by equation [2] in the description of FIG. 1. For example, the device 202 may retrieve, determine, detect, or otherwise access pose data that defines head poses of a user using the AR or VR or MR experience. The pose data may be historical pose data for the user accessing the AR or VR or MR experience. In some implementations, the pose data may be historical pose data associated with other users, applications, systems, or databases that previously experienced or utilized the AR or VR or MR experience.

At block 1006, the process 1000 includes providing the at least one positional indicator and the at least one rotational indicator to an RNN, such as RNN 226. The RNN includes a long short-term memory (LSTM) network and a fully connected (FC) network for each of a plurality of LSTM cells in the LSTM network. In some implementations, each LSTM cell may be associated with a historical time period (in a time series). For example, in the encoder, each LSTM cell uses historical pose data that includes the positional and rotational information for head poses collected over the historical time period Such data may be used to train the RNN At block 1008, the process 1000 includes using the RNN to generate at least one prediction for head pose changes for the AR or VR or MR experience for at least one upcoming time period. For example, the device 202 may use the RNN 226 and either the encoder/decoder model 230 or the state propagation model 232 to make a prediction of a head pose at one or more times in the future.

In some implementations, the process 100 may include generating additional candidate predictions based on the at least one prediction. For example, the device 202 (or other computing device) connected to or accessible from device 202 may continue to generate new predictions that can be used in real time as the user uses the AR or VR or MR environment. The at least one prediction and the additional (e.g., new) candidate predictions may undergo an error check in which device 202 determines a mean square error for each of the at least one prediction and the additional candidate predictions. The mean square error may indicate whether to discard a particular head pose prediction. For example, if the mean square error associated with a head pose prediction is determined to be above a threshold level of error, the system 200 may discard that head pose prediction so as not to skew or improperly provide erroneous head pose data to the AR or VR or MR environment. This may ensure that predicted head poses remain within a reasonable distance of a previous known head pose based on an elapsed time between the previous known head pose the predicted head poses.

In some implementations, the RNN is configured to encode for each of a plurality of timesteps within the upcoming time period, a state for a respective LSTM cell corresponding to a respective timestep in the upcoming time period. That is, the system 200 may use a feedback loop (e.g., feedback loops 422, 424, 426, 726, 728, and 730) to ensure that prior LSTM states may be considered when calculating upcoming LSTM states and head pose predictions.

In some implementations, the RNN is configured to recursively determine additional predictions for head pose changes at further upcoming time periods. For example, system 200 may employ model architecture 230 or model architecture 232 to continually determine head pose predictions as a user moves in the AR or VR or MR environment. The predictions may be utilized to provide real time content in the AR or VR or MR environment without the MTP delay that may occur with rendering content.

At block 1010, the process 1000 includes providing the at least one prediction responsive to the request and triggering display of augmented or virtual reality content in the augmented or virtual reality experience based on the at least one prediction. For example, the prediction algorithms 228 may output one or more predictions to the RNN 226 as input to another state of the RNN. The output may be used to trigger display of content at an appropriate time and location for the user accessing the AR or VR environment.

In some implementations, receiving the request for a head pose prediction includes receipt of historical head pose data from a client device over a network. For example, a request for head pose prediction may be received via network 205. Providing the at least one prediction for head pose changes may include providing rendered content in the AR or VR environment to the client device (e.g., device 204) over the network 205, based on the at least one prediction for head pose changes. In some implementations, providing the at least one prediction for head pose changes includes providing rendered content in the augmented reality experience to the client device over the network based on the at least one prediction for head pose changes.

In some implementations, the at least one positional indicator is a three-dimensional head position vector and the at least one rotational indicator is a four-dimensional quaternion. In some implementations, the at least one rotational indicator includes a yaw, a pitch, and a roll. In some implementations, the at least one rotational indicator includes a three-dimensional vector with a magnitude that represents an amount of rotation and a direction that represents an axis of rotation.

In some implementations, the RNN is configured to generate additional candidate predictions based on the at least one prediction and determine a mean square error for each of the additional candidate predictions, the mean square error indicating whether to discard a respective additional head pose prediction.

In some implementations, the RNN is configured to recursively determine additional predictions for pose changes (e.g., head pose changes, device pose changes, etc.) at further upcoming time periods.

Figure 11:
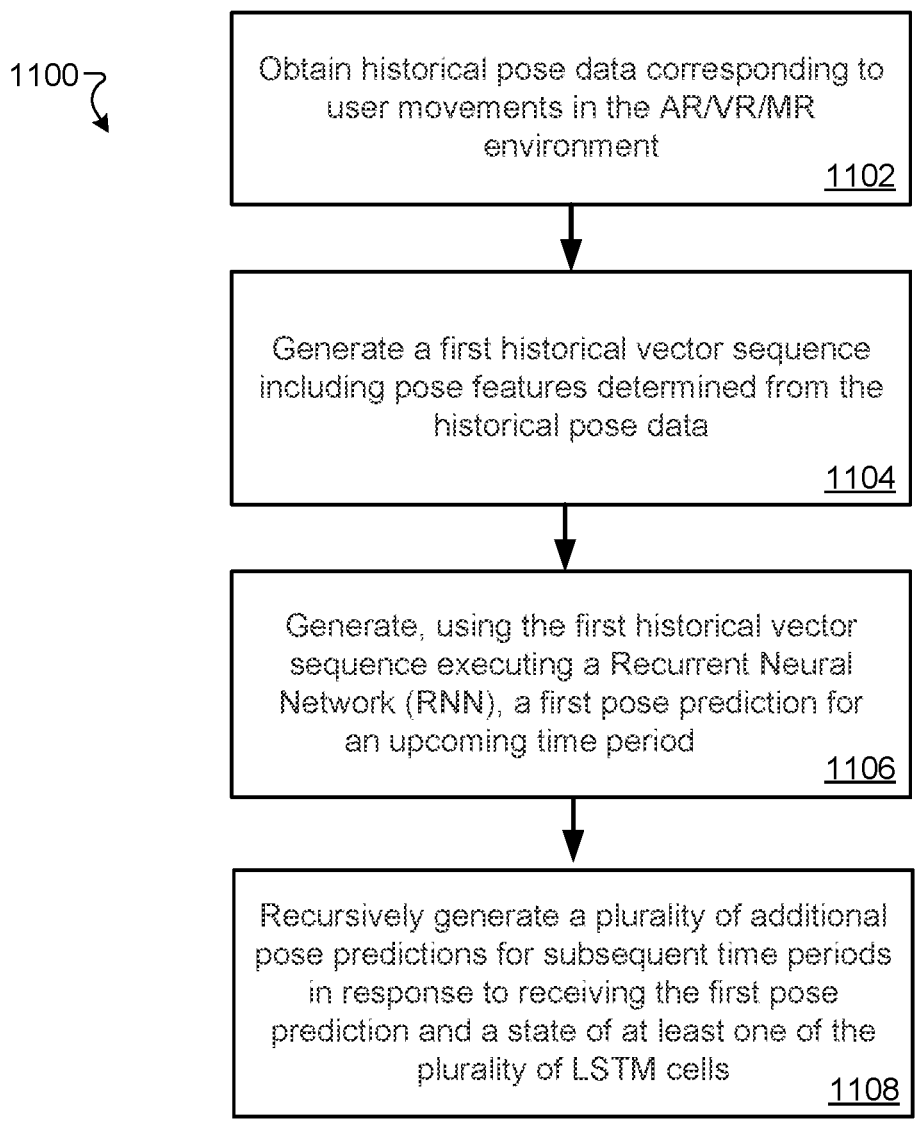
FIG. 11 is a flow chart diagramming an implementation of a process to predict head poses to provide the AR or VR or MR experience, in accordance with implementations described herein.

FIG. 11 is a flow chart diagramming an implementation of a process 1100 to predict head poses to provide an AR or VR experience, in accordance with implementations described herein. For example, the process 1100 may predict a pose of the head of a user based on historical head pose data and one or more recurrent neural networks. In some implementations, the process 1100 may predict a pose of a mobile device held by a user operating the AR or VR experience. In some implementations, the process 1100 may predict a pose of another body part of the user operating the AR or VR experience A computing device 202 may receive data defining a VR or an AR environment. The AR environment includes a representation of a physical environment. The data may include instructions for rendering and compositing a plurality of objects in the VR or AR environment.

At block 1102, the process 1100 includes obtaining historical head pose data corresponding to user movements in the VR or AR environment. For example, the process 1100 may track, retrieve, or otherwise obtain historical pose data associated with users, applications, environments, etc. In some implementations, the historical pose data is sequential pose data associated with a VR or AR application.

At block 1104, the process 1100 includes generating a first historical vector sequence including pose features determined from the historical pose data. For example, the system 202 may use the state propagation model 232 with the LSTM and fully connected network as an RNN 234 to determine a first historical vector $x_1, x_2, \ldots, x_H$ of inputs (see FIG. 7). The pose features may include variations of position and rotation. For example, the pose features may be included in the historical pose data, which may correspond to user movements in the virtual reality environment includes velocity or acceleration measurements associated with the user movements.

At block 1106, the process 1100 includes generating, using the first historical vector sequence $x_1, x_2, \ldots, x_H$ executing the RNN, a first pose prediction $\hat{x}_{H+1}$ (see FIG. 7) for an upcoming time period (e.g., one, two, three MTP into the future, etc.) The RNN may include any number of LSTM cells 710 or other cells and at least one full connected neural network layer 708.

A vector sequence $\hat{y}_1, \hat{y}_2, \ldots \hat{y}_i$ may be output by the in response to receiving, as input, the first head pose prediction and a state ($a_H$ that includes the encoded history of the head poses already collected) of at least one of the plurality of LSTM cells. In some implementations. $\hat{y}_i$ represents any number of LSTM and FC iterations that may lead to any number of predicted poses $\hat{y}_1, \hat{y}_2, \ldots \hat{y}_k$. FIG. 7 depicts an ellipses to indicate additional interactions and head pose predictions may be possible.

For example, at block 1108, the process 1100 includes recursively generating, using the RNN network, a plurality of additional pose predictions $\hat{y}_1, \hat{y}_2, \ldots$, for subsequent time periods in response to receiving the first pose prediction $\hat{x}_{H+1}$ and the state ($a_H$), of at least one of the plurality of LSTM cells, that the RNN outputs in response to receiving, as input, the first head pose prediction. Such an output vector sequence may indicate a plurality of candidate head pose predictions for time periods beyond the upcoming time period.

In some implementations, the process 1100 includes determining locations in which to display virtual reality content based on the additional pose predictions at corresponding time periods beyond the upcoming time period. In some implementations, the process 100 includes triggering render of the virtual reality content for display in the virtual reality environment.

In some implementations, the process 1100 may include determining locations in which to display virtual reality content based on the pose predictions at the corresponding time periods beyond the upcoming time period. For example, the candidate head pose predictions can be matched to real time AR or VR environment usage and content can be triggered for provision (e.g., display) in the AR or VR environment based on the predictions, the real time environment.

In some implementations, a state of each LSTM cell in the plurality of LSTM cells is provided as input to the RNN with a next sequential pose prediction and the plurality of additional pose predictions are based at least in part on the state of each LSTM cell in the plurality of LSTM cells.

In some implementations, the process 1100 includes normalization and denormalization processes. For example, if the encoder/decoder model 230 is utilized as the RNN, the first historical vector sequence $\hat{x}_{H+1}$ may be normalized based at least in part on a calculated mean value and a calculated variance value, as described in detail in the description of FIG. 4. In addition, if the encoder/decoder model 230 is utilized as the RNN, the output vector sequence $\hat{y}_{Knorm}$, may be denormalized based on the calculated mean value and the calculated variance value before the system 200 determines the locations in which to display the AR or VR content.

In some implementations, the first historical vector sequence represents input to the RNN that is normalized based at least in part on a calculated mean value and a calculated variance value. In some implementations, the first pose prediction and the plurality of additional pose predictions are denormalized based on the calculated mean value and the calculated variance value before determining locations in which to display virtual reality content.

In some implementations, a particular state of each LSTM cell in the plurality of LSTM cells is provided as input to the RNN with the first head pose prediction, as shown in FIG. 7. In this example, the plurality of candidate head pose predictions may consider the state of each LSTM cell in the plurality of LSTM cells when generating head pose predictions.

In some implementations, the RNN is trained on a database of known head pose sequences, and the RNN is configured to predict the plurality of candidate head poses by vector embedding the output vector sequence in order to output a probability measure for each candidate next head pose. This probability measure may be used in combination with error handling to ensure that each predicted head pose is free from error.

In some implementations, the RNN is configured to determine an error function that defines a mean absolute error, a smoothness cost, and a pose change cost for each of the plurality of additional (e.g., candidate) pose predictions, as described in detail in the description of FIG. 7. The error function may indicate whether to discard a respective candidate head pose prediction to reduce jitter when using the plurality of candidate head pose predictions to display virtual reality content. In some implementations, the systems described herein may enable the RNN to use such costs for training purposes to reduce the error between predictions and ground truth values. In some implementations, during inference, the loss may not be used by the systems if it is determined that ground truth values are unavailable. In some implementations, the smoothness or pose change error may be used by the systems described herein to discard samples, but a mean absolute error may not be utilized if it is determined that ground truth values are unavailable.

In some implementations, the error function is determined based on detected angular error or detected eye location error associated with one or more of the plurality of additional pose predictions. In some implementations, the error function represents a weighted error based on a portion of the plurality of the additional pose predictions.

In some implementations, the RNNs described herein may instead use Gated Recurrent Units (GRUs) 236 in place of LSTMs 234. In some implementations, different or additional input data may be used including but not limited to angular error functions (e.g., using velocities along with pose data in a prediction).

In some implementations, the system 200 may decide to perform a prediction using one or more of the RNNs described herein. For example, the system 200 may include both a first recurrent neural network (RNN) including a first plurality of long short-term (LSTM) cells and a first fully connected (FC) layer and a second recurrent neural network (RNN) including a second plurality of long short-term (LSTM) cells and a second fully connected (FC) layer. The system 200 may also include at least one processing device and memory storing instructions that when executed cause the processing device to perform operations including determining, for a user accessing an augmented or virtual reality environment, a maximum movement range being utilized by the user in the augmented reality environment, responsive to determining less than a threshold level of movement is being utilized, selecting the first RNN to determine a head pose prediction for an upcoming time period, responsive to determining less than a threshold level of movement is being utilized, and selecting the second RNN to determine a head pose prediction with reduced jitter for the upcoming time period by providing a state of each LSTM cell as an input to a next LSTM cell in the second RNN. In some implementations, the first RNN is further configured to predict a pose of a controller used in the augmented reality environment based at least in part on the head pose prediction.

Figure 12:
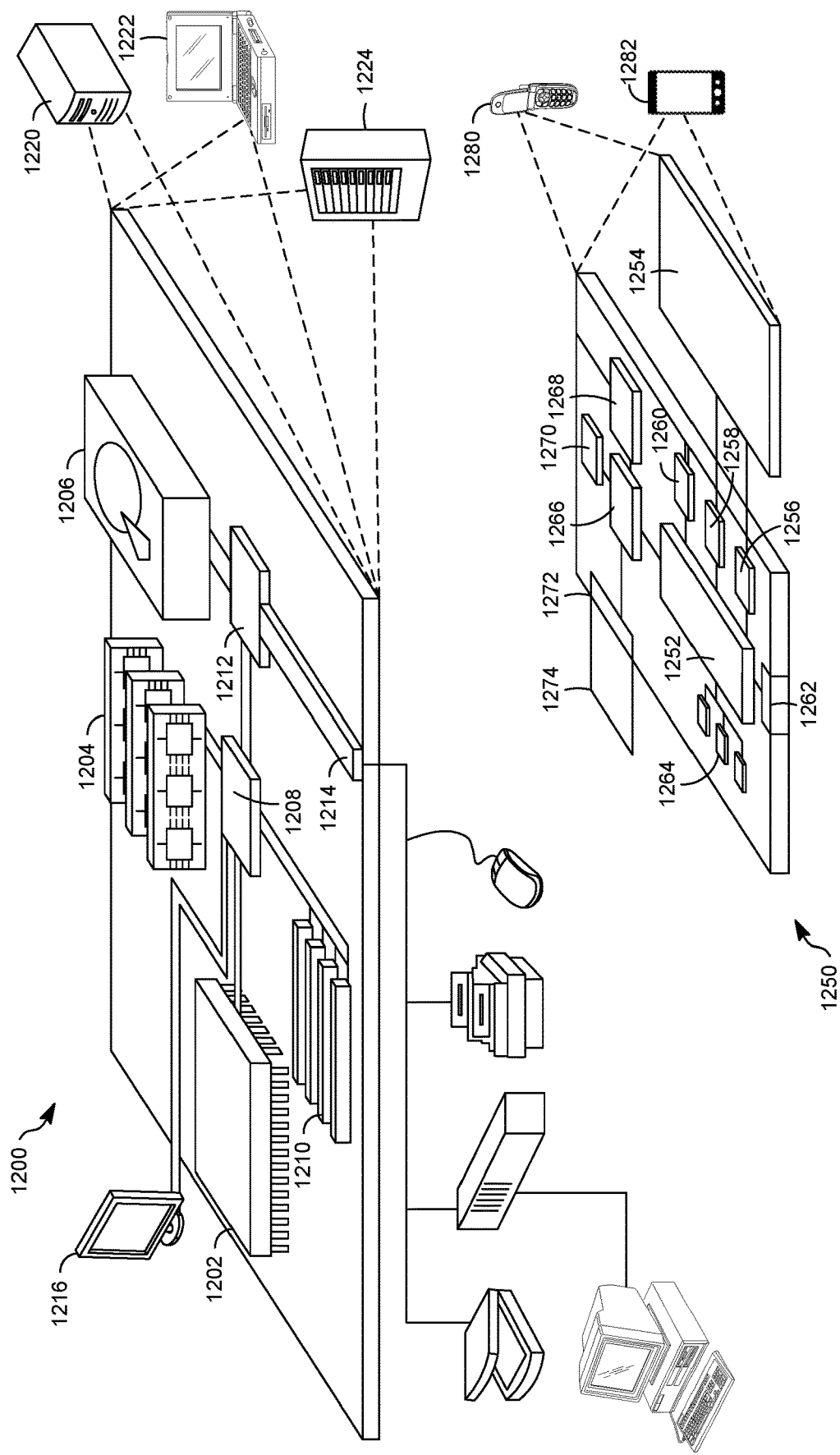
FIG. 12 illustrates an example of a computer device and a mobile computer device that can be used with the implementations described here.

FIG. 12 shows an example computer device 1200 and an example mobile computer device 1250, which may be used with the techniques described here. In general, the devices described herein can generate and/or provide any or all aspects of a virtual reality, an augmented reality, or a mixed reality environment. Features described with respect to the computer device 1200 and/or mobile computer device 1250 may be included in the portable computing devices described above. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the systems and techniques claimed and/or described in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Tin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone

1280. It may also be implemented as part of a smart phone 1282, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device based on example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 120 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Tus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Tus, a "first" element could be termed a "second" element without departing from the teachings of the present embodiments.

Unless otherwise defined, all terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method, the method comprising:
    receiving a request for a head pose prediction for a virtual reality experience;
    identifying data features including at least one positional indicator and at least one rotational indicator associated with the virtual reality experience;
    identifying historical data features including at least one positional information and at least one rotational information associated with head poses collected over a historical time period;
    providing the at least one positional indicator and the at least one rotational indicator to a Recurrent Neural Network (RNN) comprising a plurality of cells, the RNN including a plurality of recurrent steps that each include at least one of the plurality of cells and at least one fully connected (FC) layer, at least some of the plurality of cells being associated with a historical time period;
    using the RNN and the historical data features to generate at least one pose prediction corresponding to head pose changes for the virtual reality experience for at least one upcoming time period; and
    providing the at least one pose prediction responsive to the request and triggering display of virtual reality content in the virtual reality experience based on the at least one pose prediction.

2. The method of claim 1, wherein the at least one positional indicator is a three-dimensional head position vector and the at least one rotational indicator is a four-dimensional quaternion.

3. The method of claim 1, wherein the at least one rotational indicator comprises:
    a yaw, a pitch, and a roll; or
    a three-dimensional vector having a magnitude that represents an amount of rotation, and a direction that represents an axis of rotation.

4. The method of claim 1, wherein the RNN is configured to:
    generate additional candidate predictions based on the at least one pose prediction; and
    determine a mean square error for each of the additional candidate predictions, the mean square error indicating whether to discard a respective additional candidate prediction.

5. The method of claim 1, wherein the RNN is configured to recursively determine additional candidate predictions for head pose changes at further upcoming time periods.

6. The method of claim 1, wherein:
    receiving the request for a head pose prediction includes receipt of historical head pose data from a client device over a network; and
    providing the at least one pose prediction for head pose changes includes providing rendered content in the virtual reality experience to the client device over the network based on the at least one pose prediction for head pose changes.

7. A computer implemented method for predicting poses in an augmented reality environment, the method comprising:
obtaining historical pose data corresponding to user movements in the augmented reality environment collected over a historical time period;
generating a historical vector sequence including pose features determined from the historical pose data;
normalizing the historical vector sequence;
determining, using the normalized historical vector sequence executing a Recurrent Neural Network (RNN), a pose prediction for an upcoming time period, the RNN including a plurality of long short-term memory (LSTM) cells and at least one fully connected neural network layer; and
recursively generating, using the RNN and the normalized historical vector, a plurality of additional pose predictions for subsequent time periods in response to receiving the pose prediction and a state of at least one of the plurality of LSTM cells.

8. The method of claim 7, wherein the historical pose data corresponding to user movements in the augmented reality environment includes velocity or acceleration measurements associated with the user movements.

9. The method of claim 7, further comprising:
determining locations in which to display augmented reality content based on the additional pose predictions at corresponding time periods beyond the upcoming time period; and
triggering rendering of the augmented reality content for display in the augmented reality environment.

10. The method of claim 7, wherein:
the historical vector sequence represents input to the RNN that is normalized based at least in part on a calculated mean value and a calculated variance value; and
the pose prediction and the plurality of additional pose predictions are denormalized based on the calculated mean value and the calculated variance value before determining locations in which to display augmented reality content.

11. The method of claim 7, wherein:
a state of each LSTM cell in the plurality of LSTM cells is provided as input to the RNN with a next sequential pose prediction; and
the plurality of additional pose predictions are based at least in part on the state of each LSTM cell in the plurality of LSTM cells.

12. The method of claim 7, wherein:
the RNN is trained on a database of known pose sequences; and
the historical pose data is sequential pose data associated with a mobile device executing an augmented reality application.

13. The method of claim 7, wherein the RNN is configured to determine an error function that defines a mean absolute error, a smoothness cost, and a pose change cost for each of the plurality of additional pose predictions.

14. The method of claim 13, wherein:
the error function is determined based on detected angular error or detected eye location error associated with one or more of the plurality of additional pose predictions; or
the error function represents a weighted error based on a portion of the plurality of the additional pose predictions.

15. A computer program product tangibly embodied on a non-transitory computer-readable medium and comprising instructions that, when executed, are configured to cause at least one processor to:
receive a request for a pose prediction for an augmented reality experience;
identifying data features including at least one positional indicator and at least one rotational indicator associated with the augmented reality experience;
identifying historical data features including at least one positional information and at least one rotational information associated with head noses collected over a historical time period;
provide the at least one positional indicator and the at least one rotational indicator to a Recurrent Neural Network (RNN) comprising a plurality of cells, the RNN including a plurality of recurrent steps that each include at least one of the plurality of cells and at least one fully connected (FC) layer, at least some of the plurality of cells being associated with a historical time period;
use the RNN and the historical data features to generate at least one pose prediction corresponding to pose changes for the augmented reality experience for at least one upcoming time period; and
provide the at least one pose prediction responsive to the request and trigger display of augmented reality content in the augmented reality experience based on the at least one pose prediction.

16. The computer program product of claim 15, wherein the RNN is configured to:
generate additional candidate predictions based on the at least one prediction; and
determine a mean square error for each of the additional candidate predictions, the mean square error indicating whether to discard a respective additional pose prediction.

17. The computer program product of claim 15, wherein the at least one rotational indicator comprises a three-dimensional vector having a magnitude that represents an amount of rotation, and a direction that represents an axis of rotation.

18. The computer program product of claim 15, wherein the at least one positional indicator is a three-dimensional position vector and the at least one rotational indicator is a four-dimensional quaternion.

19. The computer program product of claim 15, wherein the plurality of cells are long short-term memory (LSTM) cells and the RNN is configured to recursively determine additional predictions for pose changes at further upcoming time periods.

20. The computer program product of claim 19, wherein the RNN is configured to encode as input, and for each of a plurality of timesteps within the upcoming time period, a state for a respective LSTM cell, in the plurality of LSTM cells, corresponding to a respective timestep in the upcoming time period.

* * * * *

UNITED STATES PATENT AND TRADEMARK OFFICE
CERTIFICATE OF CORRECTION

PATENT NO. : 10,989,916 B2
APPLICATION NO. : 16/545803
DATED : April 27, 2021
INVENTOR(S) : Rodgers et al.

It is certified that error appears in the above-identified patent and that said Letters Patent is hereby corrected as shown below:

On the Title Page

Column 2, Item (56), under "OTHER PUBLICATIONS", Line 5, delete "Positionn-Velocity" and insert -- Position-Velocity --, therefor.

Column 2, Item (56), under "OTHER PUBLICATIONS", Line 5, delete "Rncoder-" and insert -- Encoder- --, therefor.

On Page 2, Column 1, Item (56), under "OTHER PUBLICATIONS", Line 9, delete "Quatemions"," and insert -- Quaternions"," --, therefor.

On Page 2, Column 1, Item (56), under "OTHER PUBLICATIONS", Line 13, delete "Interational" and insert -- International --, therefor.

In the Claims

Column 30, Claim 15, Line 19, delete "noses" and insert -- poses --, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*